(12) United States Patent
Narita et al.

(10) Patent No.: US 11,605,207 B2
(45) Date of Patent: Mar. 14, 2023

(54) INFORMATION PROCESSING DEVICE, INFORMATION PROCESSING METHOD, AND PROGRAM

(71) Applicant: SONY GROUP CORPORATION, Tokyo (JP)

(72) Inventors: Gaku Narita, Kanagawa (JP); Takashi Seno, Tokyo (JP); Tomoya Ishikawa, Ibaraki (JP); Yohsuke Kaji, Chiba (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 17/422,341

(22) PCT Filed: Jan. 30, 2020

(86) PCT No.: PCT/JP2020/003351
§ 371 (c)(1),
(2) Date: Jul. 12, 2021

(87) PCT Pub. No.: WO2020/166352
PCT Pub. Date: Aug. 20, 2020

(65) Prior Publication Data
US 2022/0108533 A1    Apr. 7, 2022

(30) Foreign Application Priority Data

Feb. 13, 2019 (JP) .............................. JP2019-023226

(51) Int. Cl.
*G06T 19/00* (2011.01)
(52) U.S. Cl.
CPC ........ *G06T 19/006* (2013.01); *G06T 2210/61* (2013.01)

(58) Field of Classification Search
CPC .... G06F 3/0481; G06F 3/011; G06F 3/04815; G06T 19/006; G06T 2210/61; G06T 19/20; G06T 17/00; G06T 2200/24; G06T 19/00
See application file for complete search history.

(56) References Cited

U.S. PATENT DOCUMENTS

2020/0151965 A1*  5/2020  Forbes .................. G06T 19/006

FOREIGN PATENT DOCUMENTS

| JP | 2014-515130 A | 6/2014 |
| JP | 2016-516241 A | 6/2016 |

(Continued)

*Primary Examiner* — Xilin Guo
(74) *Attorney, Agent, or Firm* — Paratus Law Group, PLLC

(57) ABSTRACT

There is provided an information processing device, an information processing method, and a program for enabling display of AR content that has been generated for a predetermined environment and is applied to the real environment. The information processing device according to one aspect of the present technology generates a template environment map showing the environment of a three-dimensional space that is to be a template and in which a predetermined object exists, and generates template content that is a template to be used in generating display content for displaying an object superimposed on the environment of a real space, the template content including information about the object disposed at a position in the three-dimensional space, the position having a predetermined positional relationship with the predetermined object. The present technology can be applied to a transmissive HMD, for example.

5 Claims, 24 Drawing Sheets

(56) References Cited

FOREIGN PATENT DOCUMENTS

| JP | 2016-539398 A | 12/2016 |
|----|---------------|---------|
| JP | 2017-049658 A | 3/2017  |

\* cited by examiner

FIG. 11

TEMPLATE ENVIRONMENT MAP:
- THERE EXIST FLOOR SURFACE, ONE TABLE ON FLOOR SURFACE, AND FOUR CHAIRS ON FLOOR SURFACE.
- FOUR CHAIRS SURROUND TABLE.

TEMPLATE AR CONTENT:
FOUR DIFFERENT CHARACTERS ARE SEATED ON FOUR RESPECTIVE CHAIRS SURROUNDING TABLE.

FIG. 15

[Example 2-1]

REAL ENVIRONMENT MAP:
- THERE EXIST FLOOR SURFACE, ONE TABLE ON FLOOR SURFACE, AND FOUR CHAIRS ON FLOOR SURFACE.
- FOUR CHAIRS SURROUND TABLE.

AR CONTENT FOR DISPLAY:
FOUR DIFFERENT CHARACTERS ARE SEATED ON FOUR RESPECTIVE CHAIRS SURROUNDING TABLE.

FIG. 18

[Example 2-2]

REAL ENVIRONMENT MAP:
- THERE EXIST FLOOR SURFACE, ONE TABLE ON FLOOR SURFACE, FOUR CHAIRS ON FLOOR SURFACE, AND ONE SOFA ON FLOOR SURFACE.
- THREE OF CHAIRS ARE LOCATED AT POSITIONS SURROUNDING TABLE, AND REMAINING ONE OF CHAIRS IS LOCATED AWAY FROM TABLE.
- ONE SOFA IS IN VICINITY OF TABLE.

AR CONTENT FOR DISPLAY:
FOUR CHARACTERS ARE SEATED ON THREE CHAIRS SURROUNDING TABLE AND ON SOFA IN VICINITY OF TABLE.

FIG. 21

[Example 2-3]

REAL ENVIRONMENT MAP:
- THERE EXIST FLOOR SURFACE, ONE TABLE ON FLOOR SURFACE, AND THREE CHAIRS ON FLOOR SURFACE.
- THE THREE CHAIRS SURROUND TABLE.

AR CONTENT FOR DISPLAY:
ONE VIRTUAL CHAIR IS DISPLAYED AT POSITION SURROUNDING TABLE, AND FOUR CHARACTERS ARE SEATED ON THREE REAL CHAIRS AND ONE VIRTUAL CHAIR.

INFORMATION PROCESSING DEVICE, INFORMATION PROCESSING METHOD, AND PROGRAM

CROSS REFERENCE TO PRIOR APPLICATION

This application is a National Stage Patent Application of PCT International Patent Application No. PCT/JP2020/003351 (filed on Jan. 30, 2020) under 35 U.S.C. § 371, which claims priority to Japanese Patent Application No. 2019-023226 (filed on Feb. 13, 2019), which are all hereby incorporated by reference in their entirety.

TECHNICAL FIELD

The present technology relates to an information processing device, an information processing method, and a program, and more particularly, to an information processing device, an information processing method, and a program for enabling display of AR content that has been generated for a predetermined environment and is applied to the real environment.

BACKGROUND ART

Augmented reality (AR) in which a video image of a three-dimensional character and the like is superimposed and displayed on a scenery in front of a user's eyes has been attracting attention. Using a display device such as a head mounted display (HMD), a user can obtain a sense of immersion, feeling as if a character were in the same space as the space in which the user is present.

AR content that is content for achieving an AR is generated by measuring the three-dimensional shape of a specific scene in which the AR content is to be displayed, and disposing objects such as characters in a three-dimensional space shown as a result of the measurement, for example. A sensor such as an RGB camera, a depth sensor, or a LiDAR is used to measure the scene.

When the AR content is reproduced, on the other hand, the position and the posture of the user in the same specific scene as the scene measured at the time of generation of the AR content are detected, and the positions and the orientations of the objects are controlled in accordance with the detected position and posture.

CITATION LIST

Patent Documents

Patent Document 1: JP 2016-539398 W
Patent Document 2: Japanese Patent Application Laid-Open No. 2017-049658

SUMMARY OF THE INVENTION

Problems to be Solved by the Invention

The AR content generated as described above can be reproduced only in the specific scene in which the three-dimensional shape measurement has been performed. For example, AR content generated for a certain living room cannot be displayed in another living room.

The present technology has been made in view of such circumstances, and is to enable display of AR content that has been generated for a predetermined environment and is applied to a real environment.

Solutions to Problems

An information processing device according to one aspect of the present technology includes: a first map generation unit that generates a template environment map showing an environment of a three-dimensional space to be a template, a predetermined object existing in the three-dimensional space; and a first content generation unit that generates template content that is a template to be used in generating display content for displaying an object superimposed on an environment of a real space, the template content including information about the object disposed at a position in the three-dimensional space, the position having a predetermined positional relationship with the predetermined object.

An information processing device according to another aspect of the present technology includes: a template acquisition unit that acquires a template environment map showing an environment of a three-dimensional space that is to be a template and in which a predetermined object exists, and template content that is a template to be used in generating display content for displaying an object superimposed on an environment of a real space and includes information about the object disposed at a position in the three-dimensional space, the position having a predetermined positional relationship with the predetermined object; a map generation unit that generates a real environment map showing the environment of the real space; and a content generation unit that generates the display content by processing the template content on the basis of the template environment map and the real environment map.

In one aspect of the present technology, a template environment map showing an environment of a three-dimensional space that is to be a template and in which a predetermined object exists is generated, and template content that is a template to be used in generating display content for displaying an object superimposed on an environment of a real space is generated, the template content including information about the object disposed at a position in the three-dimensional space, the position having a predetermined positional relationship with the predetermined object.

In another aspect of the present technology, a template environment map showing an environment of a three-dimensional space that is to be a template and in which a predetermined object exists is acquired, and template content that is a template to be used in generating display content for displaying an object superimposed on an environment of a real space is acquired, the template content including information about the object disposed at a position in the three-dimensional space, the position having a predetermined positional relationship with the predetermined object. Further, a real environment map showing the environment of the real space is generated, and the display content is generated by processing the template content on the basis of the template environment map and the real environment map.

BRIEF DESCRIPTION OF DRAWINGS

FIG. 11 is a diagram showing an example of a template environment map and template AR content.

FIG. 15 is a diagram showing an example of a real environment map and AR content for display.

FIG. 18 is a diagram showing an example of a real environment map and AR content for display.

FIG. 21 is a diagram showing an example of a real environment map and AR content for display.

MODE FOR CARRYING OUT THE INVENTION

The following is a description of modes for carrying out the present technology. Explanation will be made in the following order.

1. AR content display device
2. Generation of AR content for display
3. Configurations of the respective devices
4. Details of each process
5. Modification <<AR Content Display Device>>

Figure 1:
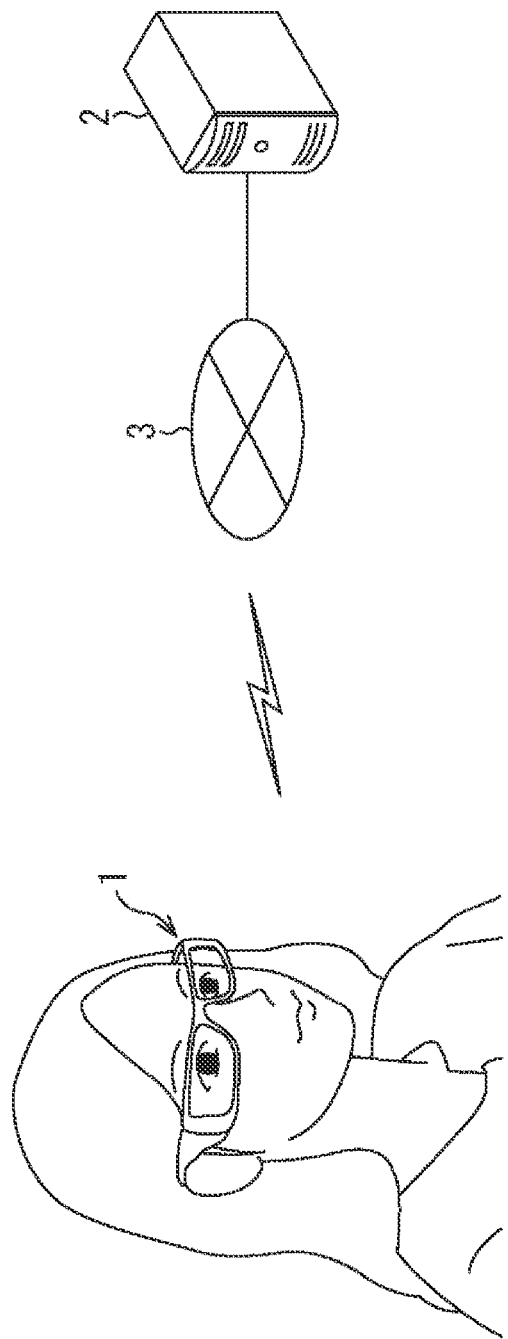
FIG. 1 is a diagram showing an example configuration of an information processing system according to an embodiment of the present technology.

FIG. 1 is a diagram showing an example configuration of an information processing system according to an embodiment of the present technology.

The information processing system shown in FIG. 1 is formed by connecting a HMD 1 and an information processing device 2 via a network 3 such as a local area network (LAN) or the Internet.

As shown in FIG. 1, the HMD 1 is a spectacle-type wearable terminal including a transmissive display unit. The HMD 1 displays a video image including various kinds of objects such as characters on the display unit, under the control of the information processing device 2 performing control via the network 3. The user views the objects superimposed on the scenery existing in front of him/her.

The method for projecting the video image including the objects may be a virtual image projection method, or may be a retinal projection method for forming an image directly on the retina of the user's eye.

The information processing device 2 reproduces AR content, and transmits the video data obtained by the reproduction to the HMD 1, to cause the HMD 1 to display a video image of the AR content. The information processing device 2 is formed with a PC, for example.

Figure 2:
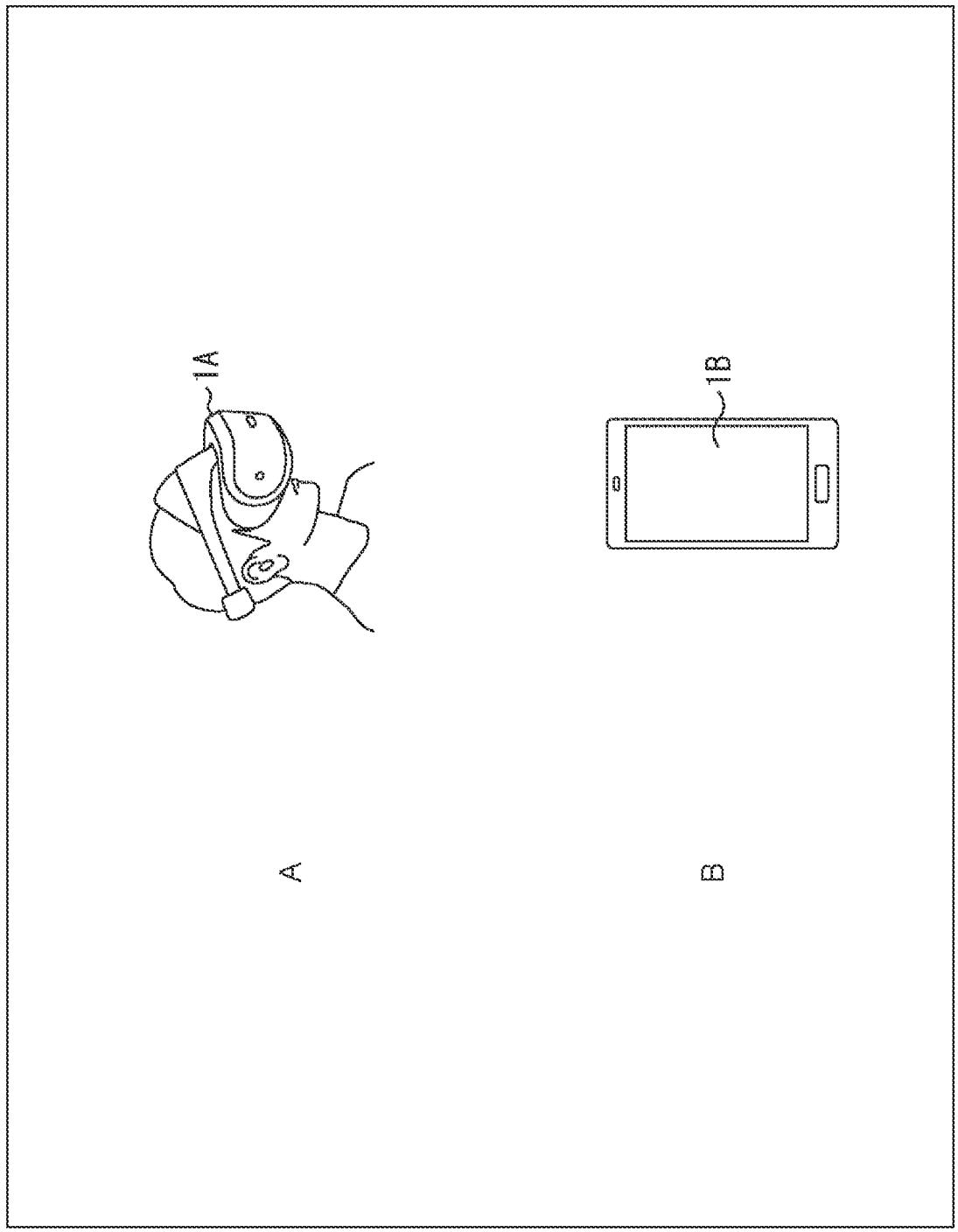
FIG. 2 is a diagram showing an example of a display device.

Instead of the HMD 1, a portable terminal, such as an HMD 1A that is a video transmissive HMD shown in A of FIG. 2 or a smartphone 1B shown in B of FIG. 2, may be used as an AR content display device.

When the HMD 1A is used as the display device, an AR content video image reproduced by the information processing device 2 is displayed, being superimposed on an image of the scenery that exists in front of the HMD 1A and has been captured by a camera provided in the HMD 1A. A display that displays AR content superimposed on an image captured by a camera is provided in front of the eyes of the user wearing the HMD 1A.

When the smartphone 1B is used, on the other hand, an AR content video image reproduced by the information processing device 2 is displayed, being superimposed on an image of the scenery that exists ahead of the smartphone 1B and has been captured by a camera provided on the back surface of the smartphone 1B. A display that displays various kinds of images is provided on the front of the smartphone 1B.

A projector that projects a video image on the surface of an object present in an actual scene may be used as an AR content display device. Various kinds of devices such as a tablet terminal and a television receiver can be used as the AR content display device.

The display device and the information processing device 2 may be connected by cables, instead of being wirelessly connected via the network 3.

<<Generation of AR Content for Display>>

Figure 3:
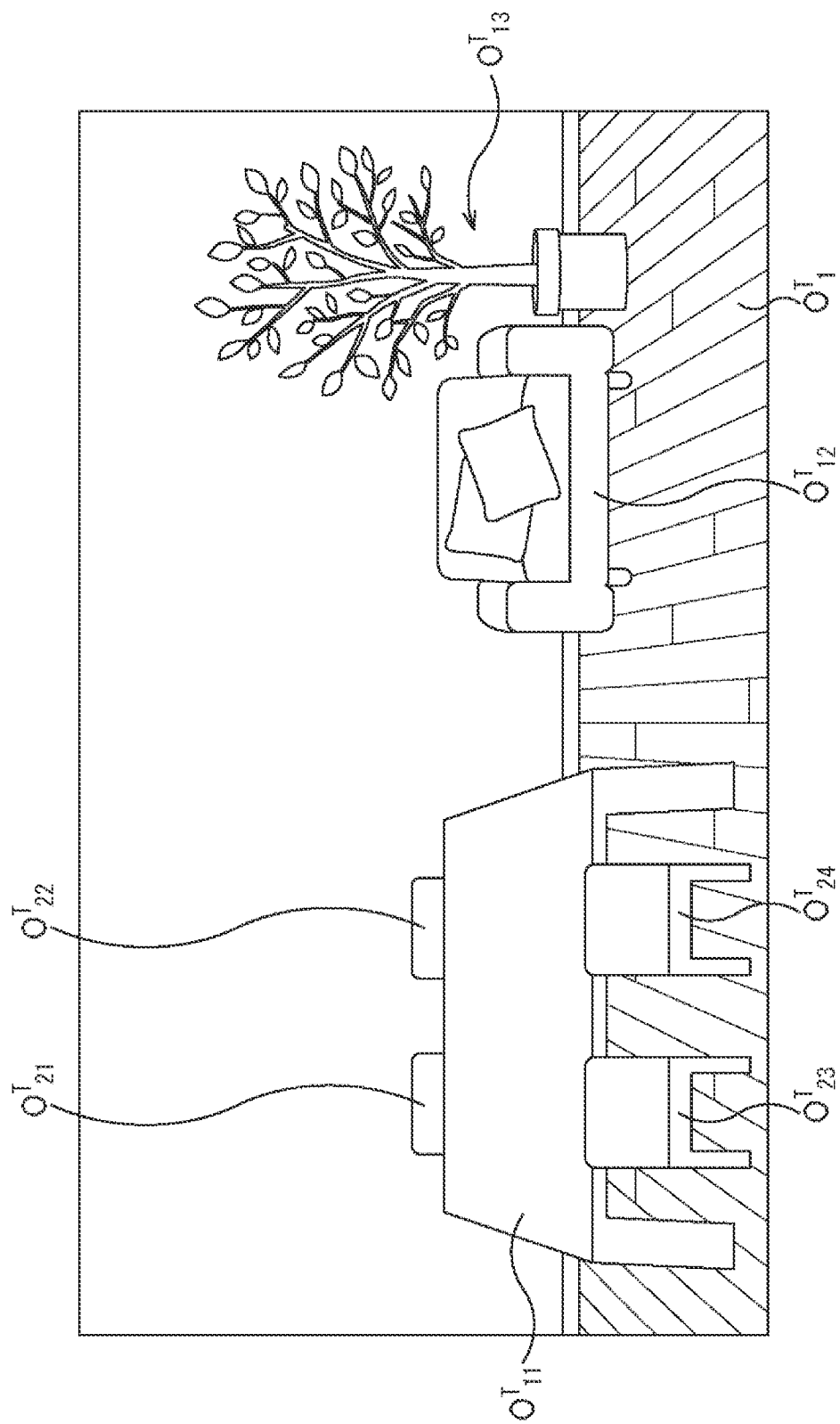
FIG. 3 is a diagram showing an example of an actual scene.

FIG. 3 is a diagram showing an example of an actual scene.

The user who views AR content is in the living room shown in FIG. 3, wearing the HMD 1. The living room shown in FIG. 3 is an actual scene (a real space) in which the user views AR content.

In the example shown in FIG. 3, objects (real objects) present in the actual scene include an object $O^T_1$ that is the floor surface, an object $O^T_{11}$ that is a table, objects $O^T_{21}$ to $O^T_{24}$ that are chairs, an object $O^T_{12}$ that is a sofa, and an object $O^T_{13}$ that is a house plant. The objects $O^T_{21}$ to $O^T_{24}$, which are four chairs, are arranged, with their front sides facing the object $O^T_{11}$, which is a table having a substantially square top. Further, the object $O^T_{12}$, which is a sofa, is disposed in the vicinity of the object $O^T_{11}$.

When AR content is reproduced in the information processing device 2, and video data of the AR content is transmitted, a video image of the AR content is displayed, being superimposed on such an actual scene.

Figure 4:
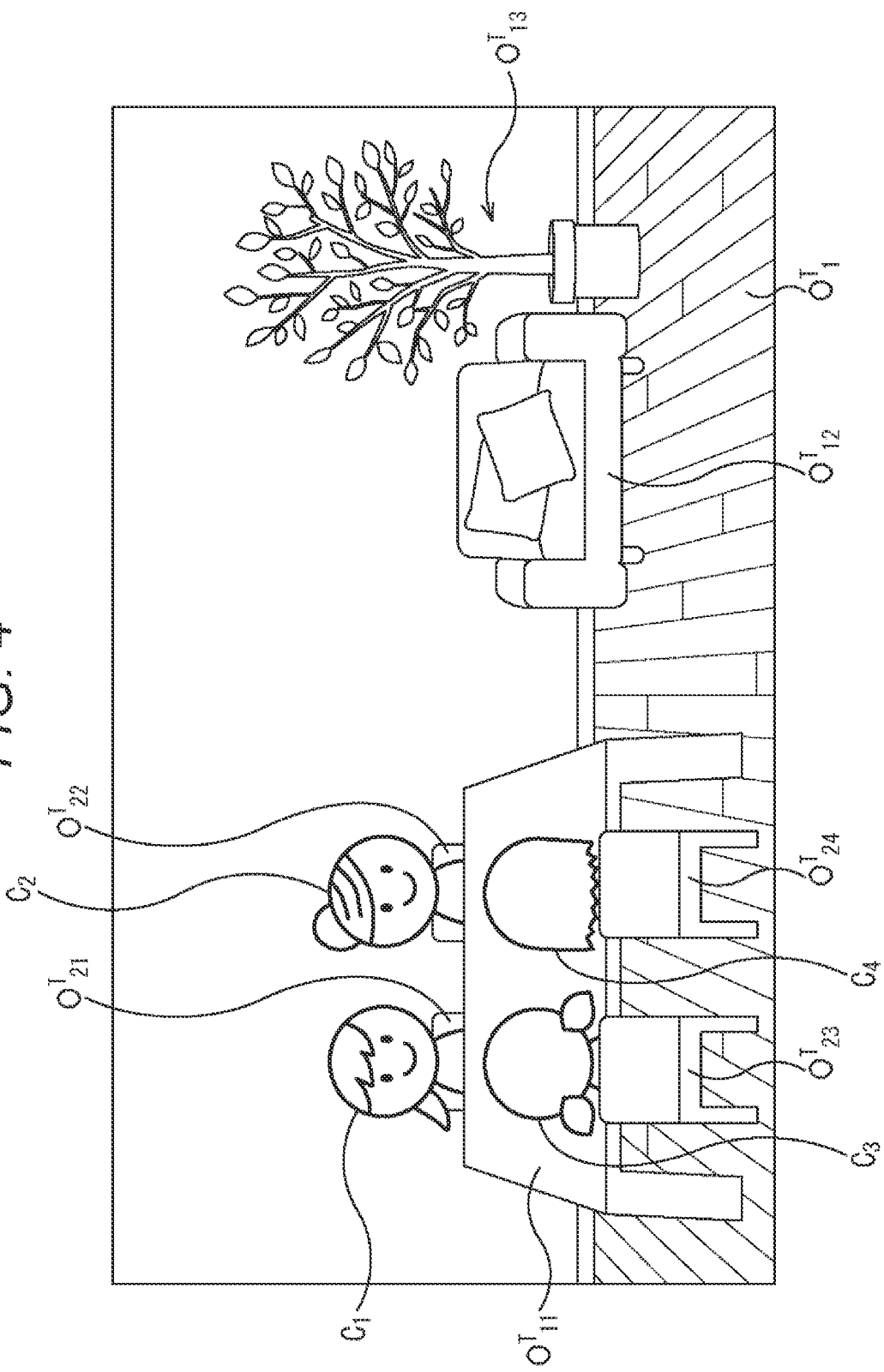
FIG. 4 is a diagram an example of display of AR content.

FIG. 4 is a diagram an example of display of AR content.

In the example shown in FIG. 4, a video image of four characters $C_1$ to $C_4$ as objects seated on the objects $O^T_{21}$ to $O^T_{24}$ as chairs is displayed. The user views the characters $C_1$ to $C_4$ seated on the objects $O^T_{21}$ to $O^T_{24}$ actually existing in front of him/her.

The objects including the characters $C_1$ to $C_4$ have a three-dimensional shape, for example. Depending on the position and posture of the user in the three-dimensional space, the appearances of the objects such as the sizes and the angles vary.

In the description below, a case where the objects included in the AR content are human-shaped characters will be mainly explained. However, other objects such as animals, vehicles, furniture, and buildings can be used as objects.

The AR content to be used to display such a video image is generated by the information processing device 2, on the basis of template AR content that is AR content prepared beforehand as a template. For example, the AR content is generated by changing the arrangement of the objects in the template AR content in accordance with the actual scene shown in FIG. 3, for example.

The actual scene is unknown to the information processing device 2 before three-dimensional shape measurement is performed. The AR content is generated by applying the template AR content generated for a specific scene to an unknown scene.

The template AR content is formed by arranging objects in the three-dimensional space represented by the three-dimensional shape of the specific scene assumed as the template.

Here, the environment including the three-dimensional shape of each scene is represented by an environment map. The environment map includes information indicating the three-dimensional shape of a scene, and information about the objects present in the scene. The information about the objects indicates the attributes, the numbers, the positions, and the like of the objects.

The three-dimensional shape of the template scene, which is the scene assumed as the template, is represented by a template environment map. The template environment map includes information indicating the three-dimensional shape of the template scene and information about the objects present in the template scene. The template scene is a scene known to the information processing device 2.

Figure 5:
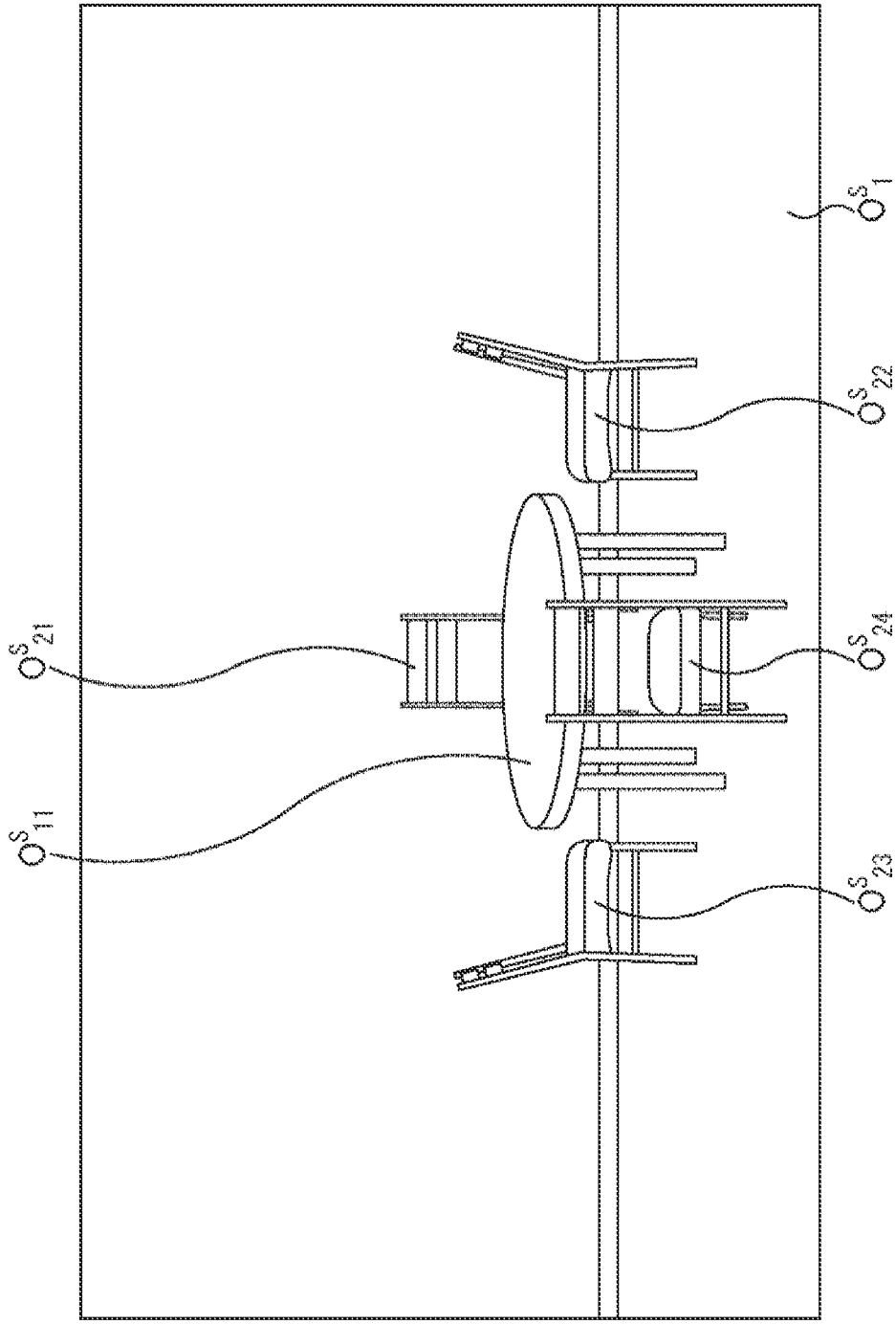
FIG. 5 is a diagram showing an example of a template scene.

FIG. 5 is a diagram showing an example of the template scene.

The template scene shown in FIG. 5 is a scene assumed as a specific living room. In the example shown in FIG. 5, the objects present in the template scene include an object $O^S_1$ that is the floor surface, an object $O^S_{11}$ that is a table, and objects $O^S_{21}$ to $O^S_{24}$ that are chairs. The objects $O^S_{21}$ to $O^S_{24}$, which are four chairs, are arranged, with their front sides facing the object $O^S_{11}$, which is a table having a circular top.

The template environment map indicates the three-dimensional shape (the three-dimensional shapes of the template scene), the attribute, the number, and the position of each of the object $O^S_1$, the object $O^S_{11}$, and the objects $O^S_{21}$ to $O^S_{24}$.

Figure 6:
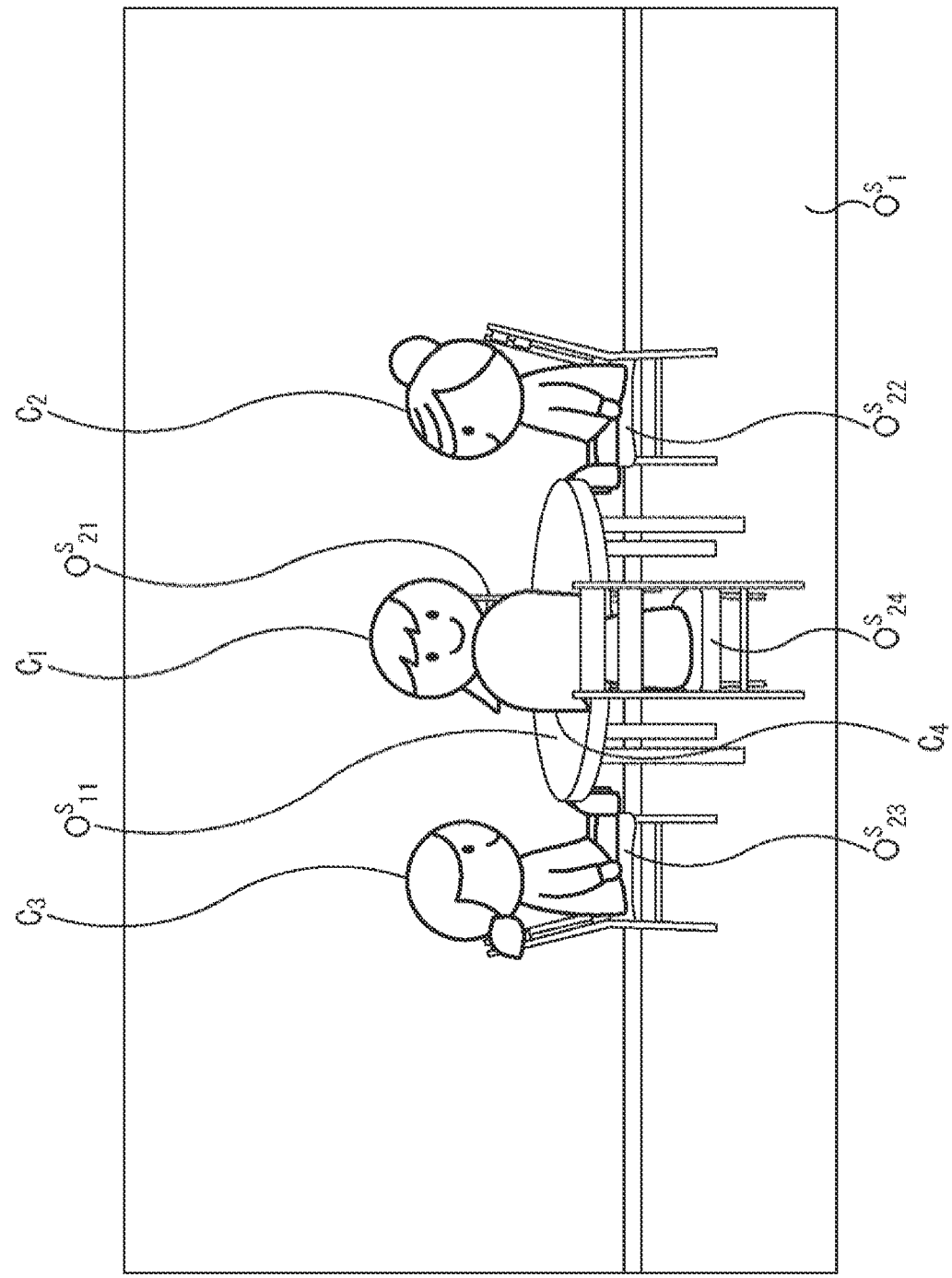
FIG. 6 is a diagram showing an example of template AR content.

FIG. 6 is a diagram showing an example of the template AR content.

As shown in FIG. 6, the template AR content is formed by arranging objects having a three-dimensional shape in the template scene.

In the example shown in FIG. 6, the template AR content is formed with a video image in which the four characters $C_1$ to $C_4$ as objects are seated on the objects $O^S_{21}$ to $O^S_{24}$ as chairs, respectively. The template AR content includes data of the video image of the characters $C_1$ to $C_4$ seated on the objects $O^S_{21}$ to $O^S_{24}$.

The AR content is reproduced on the basis of AR content for display that has been generated by processing the template AR content including the video image of the characters in such a template scene in accordance with the actual scene.

At the time of generation of the AR content for display, measurement of the actual scene is performed, and a real environment map that is an environment map indicating the three-dimensional shape of the actual scene is generated. The real environment map indicates the three-dimensional shape (three-dimensional shape of the actual scene), the attribute, the number, and the position of each of the object $O^T_1$, the object $O^T_{11}$, the objects $O^T_{21}$ to $O^T_{24}$, and the like shown in FIG. 3.

Further, the position and the posture of the user in the actual scene are estimated. With the position of the user being the reference, the AR content for display shown in FIG. 4 for making the characters $C_1$ to $C_4$ appear to be seated on the objects $O^T_{21}$ to $O^T_{24}$ that actually exist is generated on the basis of the template AR content shown in FIG. 6.

As the AR content for display generated in this manner is reproduced, the appearances of the objects described above with reference to FIG. 4 are achieved.

Figure 7:
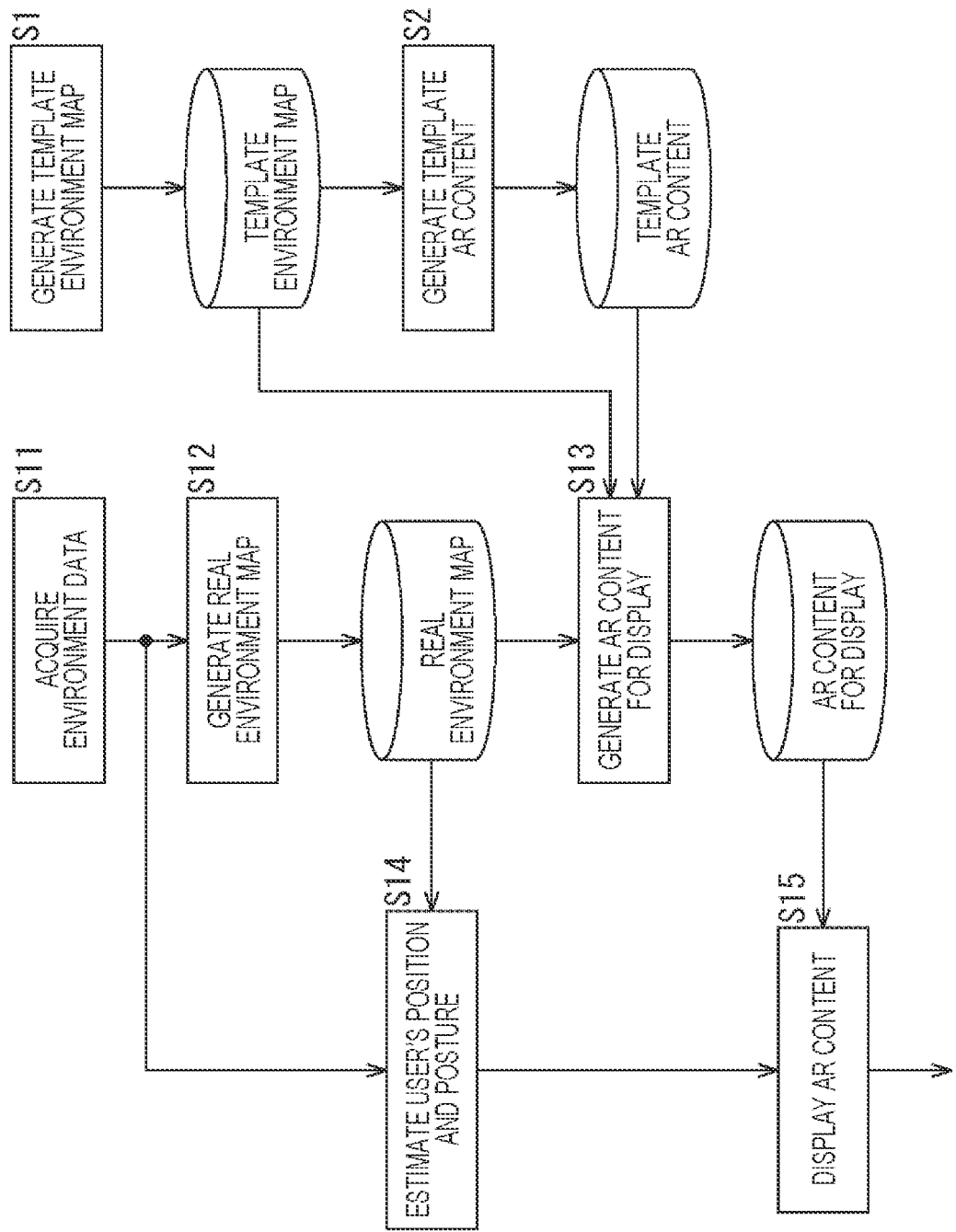
FIG. 7 is a chart showing an example of an entire process flow.

FIG. 7 is a chart showing an example of an entire process flow.

Each process shown in FIG. 7 is performed by the information processing device 2, for example. Each process will be described later in detail.

As shown in the upper right portion of FIG. 7, the template environment map (FIG. 5) is generated in the process in step S1. The template environment map is information including information indicating the three-dimensional shape of the template scene and information about the objects present in the template scene.

After the template environment map is generated, the template AR content (FIG. 6) is generated in the process in step S2. The template AR content is formed by arranging objects in the template scene in which three-dimensional shapes and the like are indicated by the template environment map.

The generation of the template environment map and the generation of the template AR content as described above are performed as pre-processing before reproduction of the AR content.

When the AR content is reproduced, environment data of the actual scene is acquired in the process in step S11. The environment data measured by the HMD 1 worn by the user is transmitted to the information processing device 2.

The environment data includes an RGB image captured by an RGB camera provided in the HMD 1, and distance information indicating the distance to each position of the objects detected by a sensor provided in the HMD 1, for example. The distance information includes a distance image measured by a depth sensor, and point cloud data (a point cloud) measured by light detection and ranging (LiDAR), for example.

After the environment data is acquired, the real environment map is generated in the process in step S12. The real environment map is information including information indicating the three-dimensional shape of the actual scene, and information about the objects present in the actual scene.

In the process in step S13, the AR content for display is generated on the basis of the template environment map, the template AR content, and the real environment map. The generation of the AR content for display is performed by comparing the template scene indicated by the template environment map with the actual scene indicated by the real environment map, and changing the positions and the orientations of the objects included in the template AR content.

Further, in the process in step S14, the position and the posture of the user in the actual scene indicated by the real environment map are estimated on the basis of the environment data acquired in step S11 and the real environment map generated in step S12. For example, the position and the posture of the HMD 1, which is a display device, are estimated as the position and the posture of the user.

In the process in step S15, the AR content for display is reproduced, and the AR content corresponding to the position and the posture estimated in step S14 is displayed. The video data corresponding to the position and the posture of the user is transmitted from the information processing device 2 to the HMD 1, and the video image is displayed, being superimposed on the actual scene.

As the AR content for display is generated with the use of the template AR content in a general-purpose manner as described above, the effects described below can be achieved.

First, the AR content provider does not need to generate AR content individually for each specific scene.

Second, the user can view and experience one general-purpose template AR content in various scenes.

Third, the AR content provider does not need to acquire beforehand the environment map of the actual scene in which the AR content is to be viewed.

<<Configurations of the Respective Devices>>

Here, the configurations of the respective devices constituting the information processing system are described.

<Configuration of the HMD 1>

Figure 8:
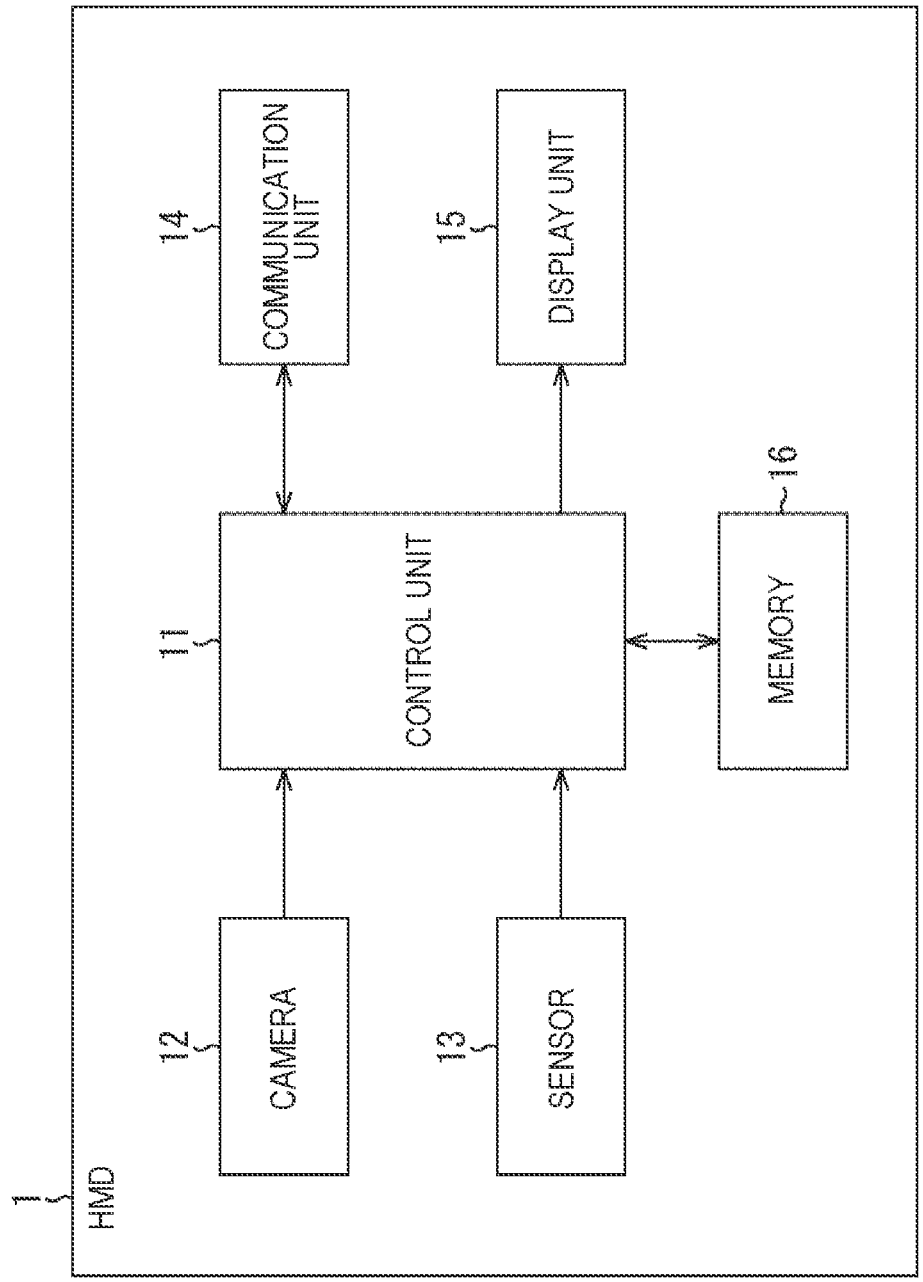
FIG. 8 is a block diagram showing an example configuration of a HMD.

FIG. 8 is a block diagram showing an example configuration of the HMD 1.

As shown in FIG. 8, the HMD 1 is formed by connecting a camera 12, a sensor 13, a communication unit 14, a display unit 15, and a memory 16 to a control unit 11.

The control unit 11 includes a central processing unit (CPU), a read only memory (ROM), and a random access memory (RAM). The control unit 11 executes a program stored in the ROM or the memory 16, to control operations of the entire HMD 1.

For example, when AR content is reproduced, the control unit 11 generates environment data on the basis of an RGB image captured by the camera 12 and a result of measurement performed by the sensor 13, and causes the communication unit 14 to transmit the environment data to the information processing device 2.

Further, when reproduction of AR content for display is performed in the information processing device 2, and video data of the AR content is received by the communication unit 14, the control unit 11 outputs the video data received by the communication unit 14 to the display unit 15, and causes the display unit 15 to display the video data.

The camera 12 captures a scenery in front of the user at a predetermined timing such as at the time of reproduction of the AR content. The camera 12 outputs an RGB image obtained by performing imaging, to the control unit 11.

The sensor 13 includes a depth sensor and a LiDAR. The depth sensor and the LiDAR constituting the sensor 13 measure the distance to each of the positions constituting the actual scene, and output a distance image, point cloud data, and the like as the data indicating the measurement results, to the control unit 11.

The sensor 13 also includes various sensors such as an acceleration sensor, a gyroscope sensor, and a positioning sensor, as appropriate. In this case, results of measurement performed by the acceleration sensor, the gyroscope sensor, and the positioning sensor are included in the environment data, and are transmitted to the information processing device 2. The results of measurement performed by the acceleration sensor, the gyroscope sensor, and the positioning sensor are used for estimating the position and the posture of the user.

The communication unit 14 includes a communication module such as a wireless LAN. The communication unit 14 communicates with the information processing device 2 via the network 3, and transmits the environment data supplied from the control unit 11 to the information processing device 2. The communication unit 14 also receives video data transmitted from the information processing device 2, and outputs the video data to the control unit 11.

The display unit 15 displays a video image of the AR content, on the basis of the video data supplied from the control unit 11.

The memory 16 is a storage medium such as a flash memory. The memory 16 stores various kinds of data such as the program to be executed by the CPU of the control unit 11.

<Example Configuration of the Information Processing Device 2>

Figure 9:
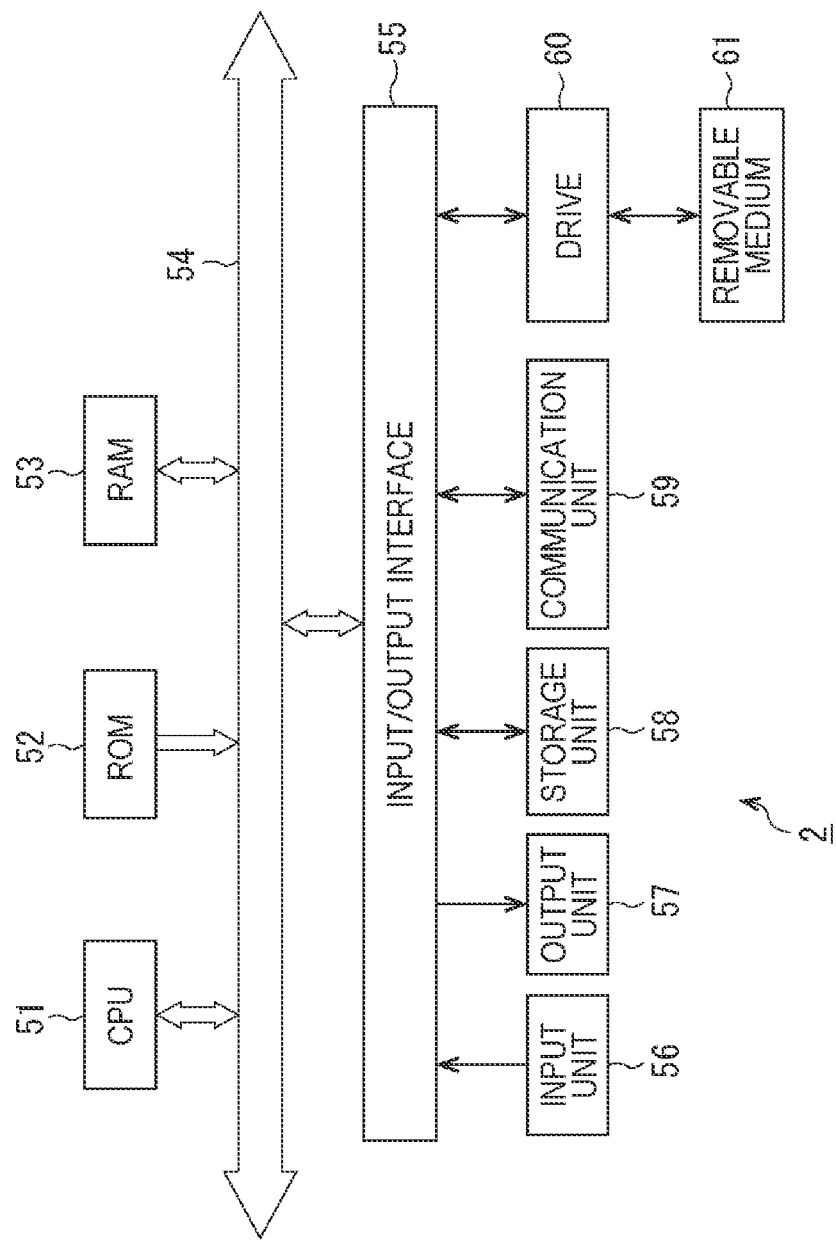
FIG. 9 is a block diagram showing an example configuration of an information processing device.

FIG. 9 is a block diagram showing an example configuration of the information processing device 2.

A CPU 51, a ROM 52, and a RAM 53 are connected to one another by a bus 54.

An input/output interface 55 is further connected to the bus 54. An input unit 56 formed with a keyboard, a mouse, and the like, and an output unit 57 formed with a display, a speaker, and the like are connected to the input/output interface 55. Further, a storage unit 58 formed with a hard disk, a nonvolatile memory, or the like, a communication unit 59 formed with a network interface or the like, and a drive 60 that drives a removable medium 61 are connected to the input/output interface 55.

Figure 10:
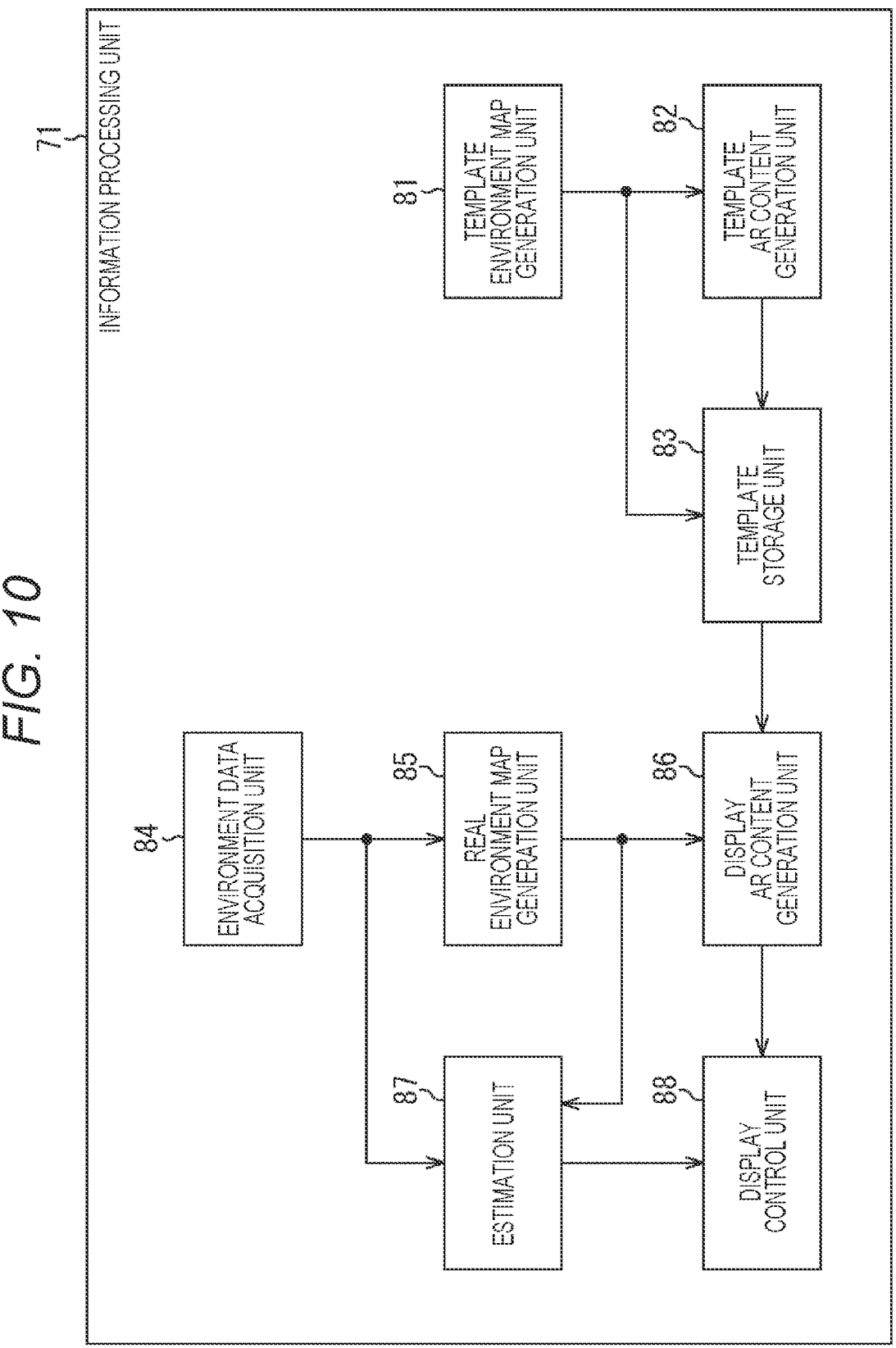
FIG. 10 is a block diagram showing an example functional configuration of the information processing device.

FIG. 10 is a block diagram showing an example functional configuration of the information processing device 2.

In the information processing device 2, the CPU 51 shown in FIG. 9 executes a predetermined program, to form an information processing unit 71.

The information processing unit 71 includes a template environment map generation unit 81, a template AR content generation unit 82, a template storage unit 83, an environment data acquisition unit 84, a real environment map generation unit 85, a display AR content generation unit 86, an estimation unit 87, and a display control unit 88.

The template environment map generation unit 81 generates a template environment map. The process in step S1 in FIG. 7 is a process to be performed by the template environment map generation unit 81. The template environment map generated by the template environment map generation unit 81 is supplied to the template AR content generation unit 82 and the template storage unit 83.

The template AR content generation unit 82 generates template AR content, using the template environment map supplied from the template environment map generation unit 81. The process in step S2 in FIG. 7 is a process to be performed by the template AR content generation unit 82.

Data of objects, information specifying the positions and the orientations of the objects in the template scene, and the like are input to the template AR content generation unit 82, as appropriate, and are used for generating the template AR content. The template AR content generated by the template AR content generation unit 82 is supplied to the template storage unit 83.

The template storage unit 83 stores the template environment map generated by the template environment map generation unit 81, and the template AR content generated by the template AR content generation unit 82. The template environment map and the template AR content stored in the template storage unit 83 are read by the display AR content generation unit 86 when AR content for display is generated.

The environment data acquisition unit 84 acquires environment data that has been transmitted from the HMD 1 at the time of reproduction of the AR content and been received by the communication unit 59. The process in step S11 in FIG. 7 is a process to be performed by the environment data acquisition unit 84. The environment data acquired by the environment data acquisition unit 84 is supplied to the real environment map generation unit 85 and the estimation unit 87.

The real environment map generation unit 85 generates a real environment map on the basis of the environment data supplied from the environment data acquisition unit 84. The process in step S12 in FIG. 7 is a process to be performed by the real environment map generation unit 85. The real environment map generated by the real environment map generation unit 85 is supplied to the display AR content generation unit 86 and the estimation unit 87.

The display AR content generation unit 86 reads and acquires the template environment map and the template AR content from the template storage unit 83. The display AR content generation unit 86 generates AR content for display, on the basis of the data read from the template storage unit 83 and the real environment map supplied from the real environment map generation unit 85. The generation of the AR content for display is performed by processing the template AR content in accordance with the actual scene indicated by the real environment map, for example.

The process in step S13 in FIG. 7 is a process to be performed by the display AR content generation unit 86. The AR content for display generated by the display AR content generation unit 86 is supplied to the display control unit 88.

The estimation unit 87 estimates the position and the posture of the user in the actual scene, on the basis of the environment data supplied from the environment data acquisition unit 84 and the real environment map supplied from the real environment map generation unit 85. The process in step S14 in FIG. 7 is a process to be performed by the estimation unit 87. Information indicating the result of the estimation performed by the estimation unit 87 is supplied to the display control unit 88.

The display control unit 88 reproduces the AR content for display supplied from the display AR content generation unit 86, and generates video data corresponding to the position and the posture estimated by the estimation unit 87. The process in step S15 in FIG. 7 is a process to be performed by the display control unit 88. The display control unit 88 controls the communication unit 59 to transmit the video data to the HMD 1, and causes the HMD 1 to display a video image of the AR content for display.

<<Details of Each Process>>

Here, the processes to be performed by the respective components of the information processing unit 71 are described in detail.

<Generation of a Template Environment Map and Template AR Content>

First, generation of a template environment map, and generation of template AR content are described.

Generation of a Template Environment Map

A template environment map generated by the template environment map generation unit 81 includes information indicating one or more objects $O^S\_i$ associated with an attribute $X\_i$, and information indicating the relative positional relationship between the objects $O^S\_i$.

The attribute $X\_i$ indicates the category of the object $O^S\_i$, such as floor surface, table, or chair.

The relative positional relationship between the objects $O^S\_i$ is expressed as the difference between the positions of the respective objects $O^S\_i$ in the template scene that is a three-dimensional space, for example. The relative positional relationship between the objects $O^S\_i$ may be indicated by a rotational component in addition to a translational component.

The template environment map generation unit 81 generates the template environment map by disposing 3D CAD models of objects with which attributes are associated, for example, in a virtual three-dimensional space such as a game engine. The template environment map generation unit 81 also generates, as the template environment map, a natural language indicating the attributes, the numbers, the relative positional relationship, and the like of the objects present in the template scene.

Generation of Template AR Content

Template AR content generated by the template AR content generation unit 82 includes information about one or more objects $C\_j$, and information indicating the relative positional relationship between each object $C\_j$ and each object $O^S\_i$ written in the template environment map.

Here, the relative positional relationship between an object $C\_j$ and an object $O^S\_i$ may be represented by a rotational component in addition to a translational component.

FIG. 11 is a diagram showing an example of the template environment map and the template AR content.

In the example in FIG. 11, the template environment map and the template AR content are shown by text.

The template environment map shown in the upper portion of FIG. 11 indicates a scene as shown in FIG. 5, in which there exist a floor surface, and one table and four chairs on the floor surface, with the four chairs surrounding the table.

The template AR content shown in the lower portion of FIG. 11 is content that realizes an appearance as shown in FIG. 6, in which four different characters are seated on the four chairs surrounding the table.

Note that information regarding the user viewing the AR content may be included as a part or all of the information regarding the objects written in the template environment map.

In this case, template AR content such as "A character is seated on the chair closest to him/her." is generated, for example. Here, the "user" and the "chair" each correspond to an object $O^S\_i$. Also, "closest to the user" is defined by information indicating the relative positional relationship between the two.

Alternatively, dynamic template AR content in which objects move in the template scene may be generated.

In this case, template AR content such as "There exist a floor surface and two chairs on the floor surface, and the character seated on one of the chairs rises, moves on the floor surface, and sits on the other chair." is generated, for example.

<Generation of a Real Environment Map>

Next, generation of a real environment map is described.

Figure 12:
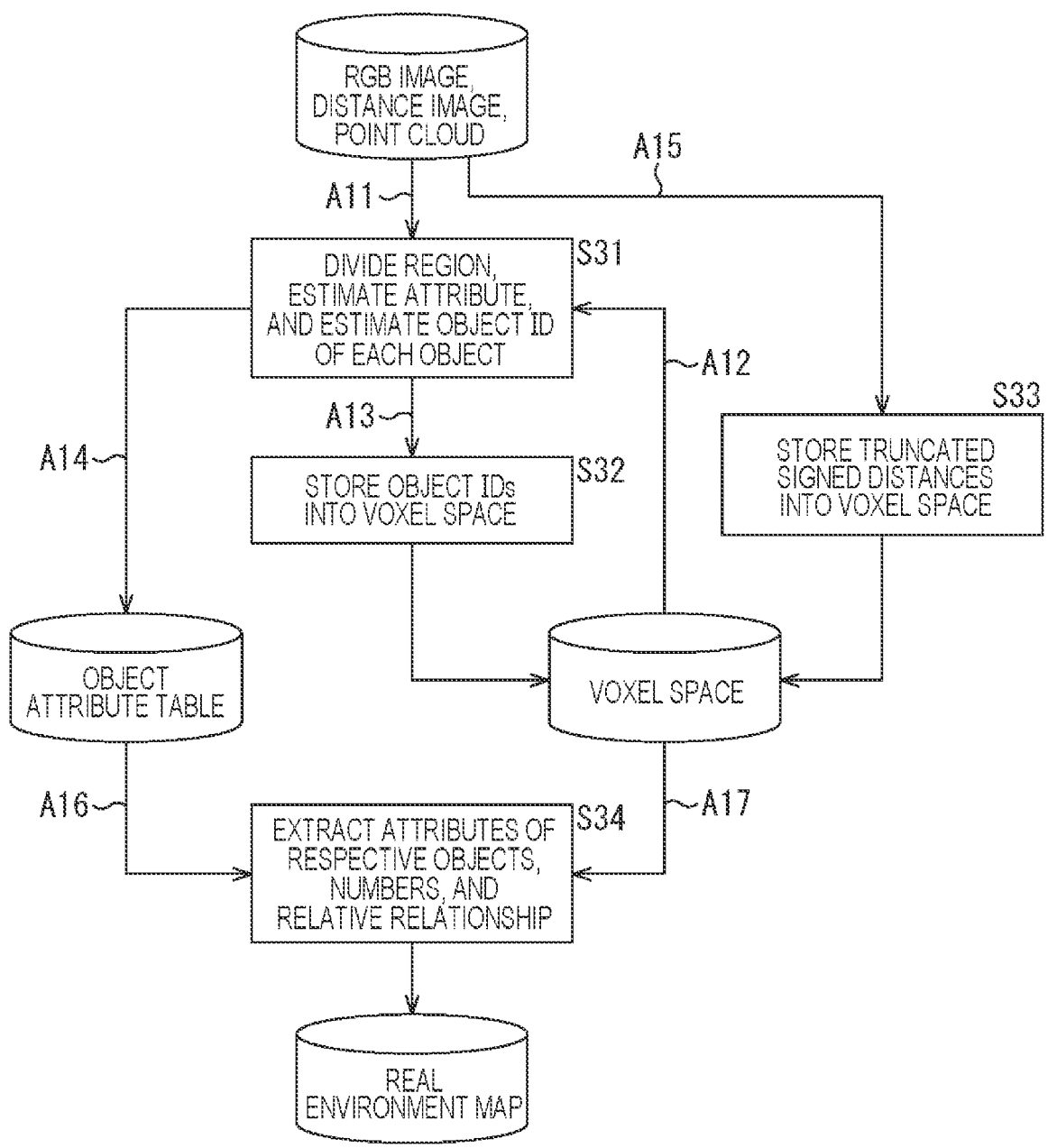
FIG. 12 is a chart showing an example flow of a real environment map generation process.

FIG. 12 is a chart showing an example flow of a real environment map generation process.

As shown in the upper portion of FIG. 12, a real environment map is generated by the real environment map generation unit 85, when environment data including an RGB image, a distance image, point cloud data, and the like is supplied from the environment data acquisition unit 84.

For example, environment data is repeatedly transmitted from the HMD 1 at predetermined intervals. On the basis of the environment data being sequentially transmitted, a real environment map is generated.

For example, a voxel space formed with voxels storing truncated signed distances to the surfaces of the objects present in the actual scene and object IDs for uniquely identifying the objects present in the scene is prepared. Also, an object attribute table for managing the attributes of the respective objects is prepared.

First, as shown at the tip of an arrow A11, in the process in step S31, the real environment map generation unit 85 performs region dividing, attribute estimation, and object ID estimation with respect to the object represented by an image and a point cloud, on the basis of an RGB image, a distance image, and point cloud data supplied from the environment data acquisition unit 84.

By the region dividing, the regions of the respective objects present in the actual scene are identified.

Also, by the attribute estimation, the attributes of the objects are estimated. The real environment map generation unit 85 has data for estimating the attribute of an object on the basis of features such as a shape indicated by an image and point cloud data.

By the object ID estimation, the object ID of each object whose region has been identified and whose attribute has been estimated is estimated. The object ID estimation is a process necessary for achieving consistency with the object IDs assigned to the objects, and is performed, as appropriate, with reference to the object IDs already stored in the voxel space as indicated by an arrow A12. Further, an object tracking process may be performed on the basis of the image and the point cloud data that are input as time-series data, and the object IDs may be estimated on the basis of the result of the object tracking.

As indicated at the tip of an arrow A13, in the process in step S32, the real environment map generation unit 85 stores the object IDs estimated by the object ID estimation into the voxel space, on the basis of the distance image or the point cloud data. The object IDs are set as information about the voxels at positions corresponding to the distances to the objects.

As indicated at the tip of an arrow A14, the real environment map generation unit 85 stores the results of the attribute estimation performed for each object and the results of the object ID estimation into the object attribute table. In the object attribute table, the attributes of the respective objects associated with the object IDs are managed.

As indicated at the tip of an arrow A15, in the process in step S33, the real environment map generation unit 85 calculates a truncated signed distance to the object surface of each object, on the basis of the RGB image, the distance image, and the point cloud data supplied from the environment data acquisition unit 84, and stores the distances into the voxel space. The information stored in the voxels constituting the voxel space indicates the IDs of the objects at the positions corresponding to the respective voxels.

A method for calculating a truncated signed distance and a method for storing the distance into a voxel space are disclosed in the following document, for example.

"Newcombe, Richard A., et al. "KinectFusion: Real-time dense surface mapping and tracking." Mixed and augmented reality (ISMAR), 2011 10th IEEE international symposium on. IEEE, 2011."

As indicated at the tips of arrows A16 and A17, in the process in step S34, the real environment map generation unit 85 integrates the information in the voxel space and the information in the object attribute table, and extracts the three-dimensional shape of the actual scene, the attributes and the positions of the respective objects present in the actual scene, and the relative positional relationship between the objects present in the actual scene. The real environment map generation unit 85 generates information including the extracted information as a real environment map, as indicated at the tip of an arrow A18.

Figure 13:
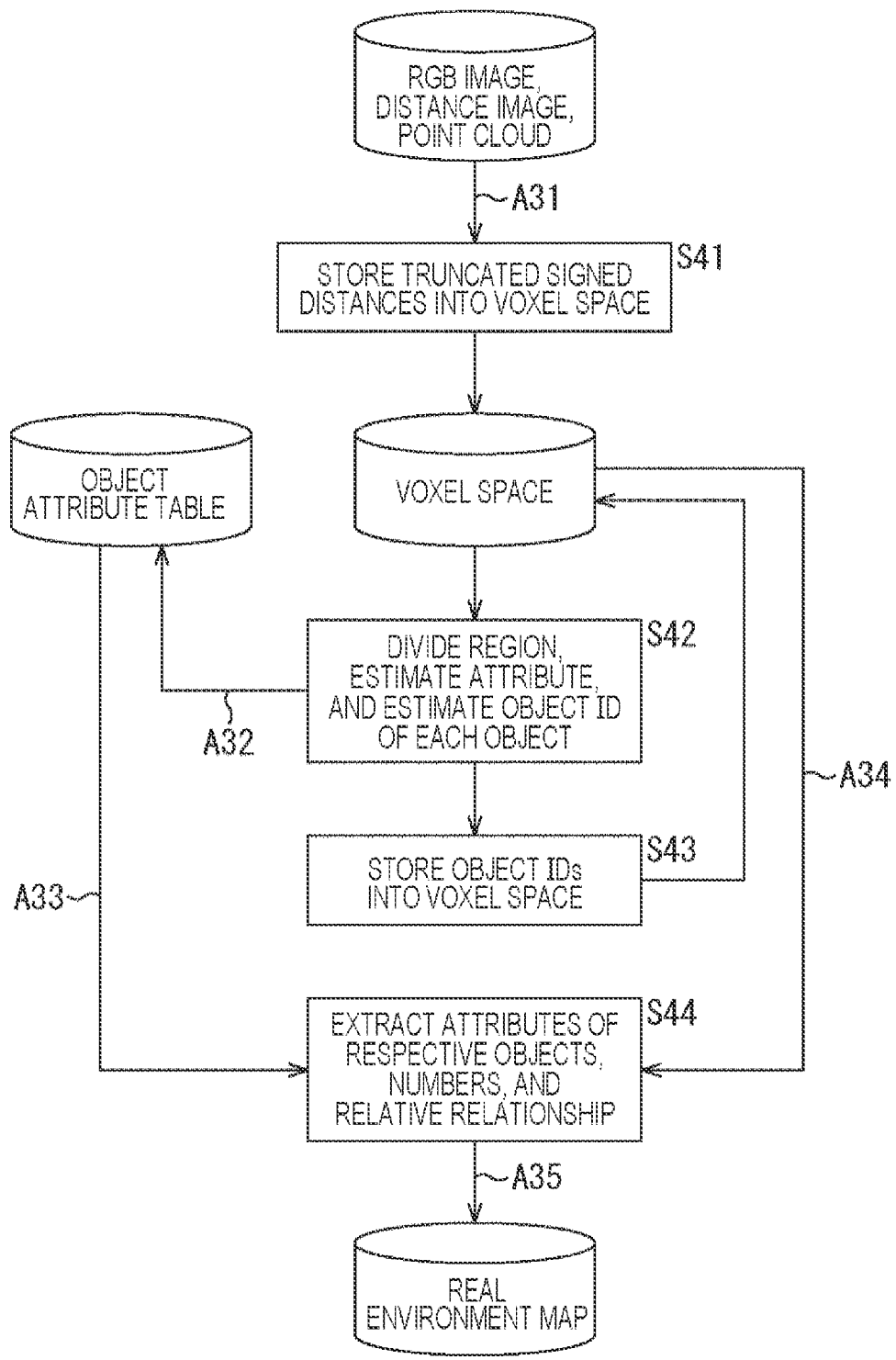
FIG. 13 is a chart showing another example flow of a real environment map generation process.

FIG. 13 is a chart showing another example flow of a real environment map generation process.

The real environment map generation process shown in FIG. 13 is a processing of first storing truncated signed distances into the voxel space, and performing region dividing, attribute estimation, object ID estimation, and the like of objects on the basis of the information stored in the voxel space.

Specifically, as indicated at the tip of an arrow A31, in the process in step S41, the real environment map generation unit 85 calculates a truncated signed distance to the object surface of each object, on the basis of an RGB image, a distance image, and point cloud data supplied from the environment data acquisition unit 84, and stores the distances into the voxel space.

In step S42, the real environment map generation unit 85 extracts an array of truncated signed distances, point cloud data, a mesh, and the like from the voxel space, and performs region dividing, attribute estimation, and object ID estimation with respect to objects, on the basis of the extracted information.

The processes thereafter are similar to the processes described with reference to FIG. 12. That is, in the process in step S43, the real environment map generation unit 85 stores the object IDs estimated by the object ID estimation, into the voxel space.

As indicated at the tip of an arrow A32, the real environment map generation unit 85 stores the results of the attribute estimation performed for each object and the results of the object ID estimation into the object attribute table.

As indicated at the tips of arrows A33 and A34, in the process in step S44, the real environment map generation unit 85 integrates the information in the voxel space and the information in the object attribute table, and extracts the three-dimensional shape of the actual scene, the attributes and the positions of the respective objects present in the actual scene, and the relative positional relationship between the objects present in the actual scene. The real environment map generation unit 85 generates information including the extracted information as a real environment map, as indicated at the tip of an arrow A35.

As described above, the order of the processes in the respective steps regarding generation of a real environment map can be changed as appropriate.

Further, as for the technique to be used in the real environment map generation process, it is possible to adopt various kinds of techniques for estimating the three-dimensional shape of the actual scene and the like on the basis of an RGB image captured by a camera and the results of measurement performed by various kinds of sensors.

<Generation of AR Content for Display>

Next, generation of AR content for display is described.

Figure 14:
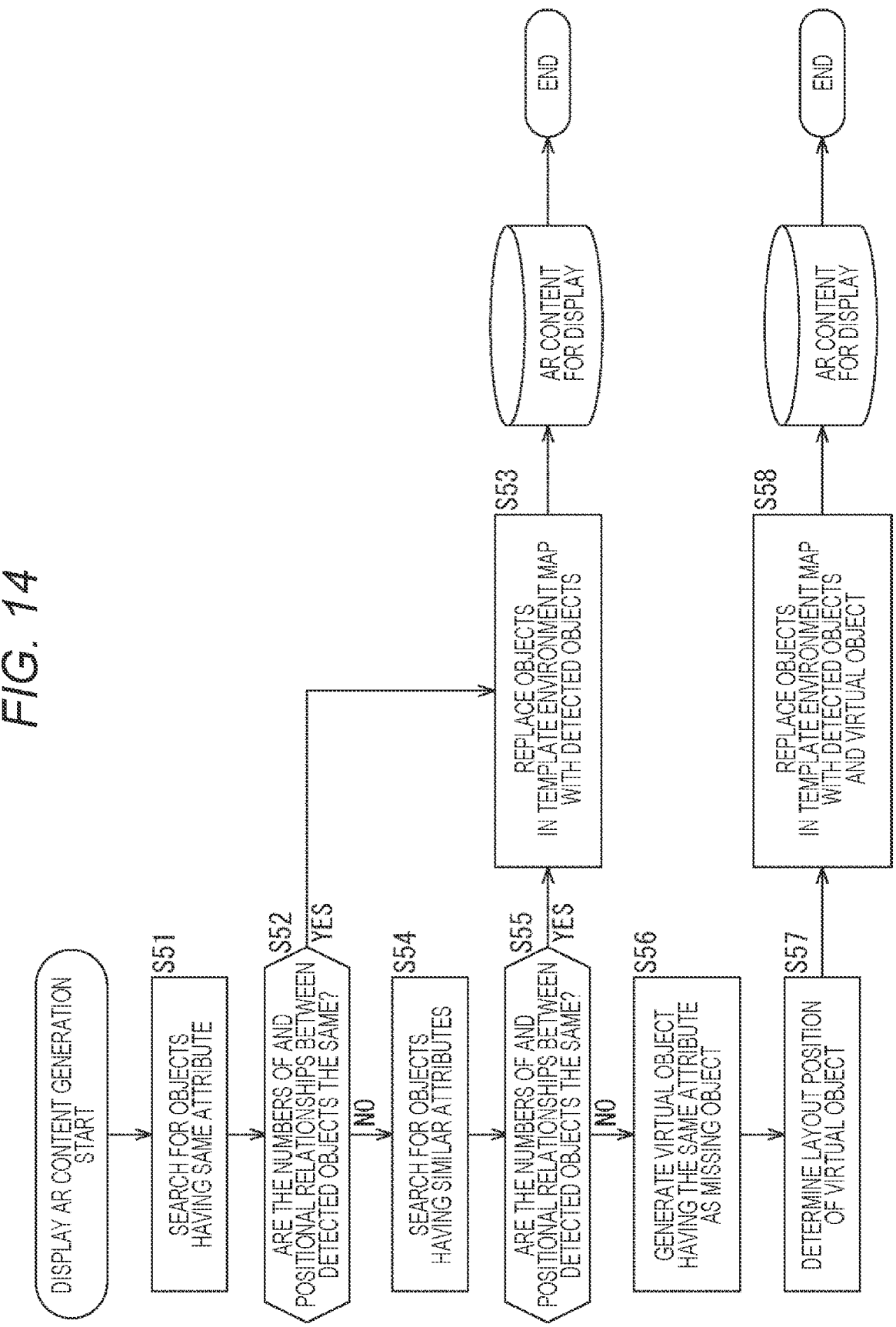
FIG. 14 is a flowchart for explaining a display AR content generation process.

Referring now to a flowchart in FIG. 14, a display AR content generation process to be performed by the display AR content generation unit 86 is described.

AR content for display is generated with the use of a template environment map and template AR content that have been read from the template storage unit 83, and a real environment map generated by the real environment map generation unit 85.

In step S51, the display AR content generation unit 86 searches for an object $O^T\_i$ having the same attribute $X\_i$ as an object $O^S\_i$ indicated by the template environment map, from among the objects $O^T\_i$ present in the actual scene indicated by the real environment map.

In step S52, the display AR content generation unit 86 determines whether or not the number of the detected objects $O^T\_i$ and the relative positional relationship between the objects $O^T\_i$ match the number of the objects $O^S\_i$ having the attribute $X\_i$ and the relative positional relationship between the objects $O^S\_i$ indicated by the template environment map, respectively.

Here, when the same number of objects having the same attribute are present in both the template scene and the actual scene, and the positional relationship between the objects having the same attribute in the template scene is the same as the positional relationship in the actual scene, it is determined that the conditions are satisfied. The positional relationship between the objects does not need to be completely the same, and it may be determined that the conditions are satisfied when the similarity of the positional relationship is equal to or higher than a threshold.

If it is determined in step S52 that the number of and the relative positional relationship between the detected objects $O^T\_i$ match the number of and the relative positional relationship between the objects $O^S\_i$, respectively, the process moves on to step S53.

In step S53, the display AR content generation unit 86 generates AR content for display by replacing the positions of the objects based on the positions of the objects $O^S\_i$ in the template AR content with the positions based on the positions of the objects $O^T\_i$.

The positional relationship between the objects and the objects $O^T\_i$ in the AR content for display becomes the same as the positional relationship between the objects and the objects $O^S\_i$ in the template AR content.

FIG. 15 is a diagram showing an example (Example 2-1) of the real environment map and the AR content for display.

The real environment map shown in the upper portion of FIG. 15 indicates a scene as shown in FIG. 3, in which there exist a floor surface, and one table and four chairs on the floor surface, with the four chairs surrounding the table.

For example, when a template environment map indicating the template scene (FIG. 5) described with reference to FIG. 11 has been prepared, the object $O^T_{11}$ (FIG. 3) having the same attribute "table" as the object $O^S_{11}$ (FIG. 5) is detected as an object $O^T\_i$ having the same attribute $X\_i$ as the object $O^S\_i$.

Also, the object $O^T_{21}$ having the same attribute "chair" as the object $O^S_{21}$, the object $O^T_{22}$ having the same attribute "chair" as the object $O^S_{22}$, the object $O^T_{23}$ having the same attribute "chair" as the object $O^S_{23}$, and the object $O^T_{24}$ having the same attribute "chair" as the object $O^S_{24}$ are all detected.

Further, it is determined that the numbers of the object $O^S_{11}$ (table) and the objects $O^S_{21}$ to $O^S_{24}$ (chairs), and the positional relationship between them in the template scene are the same as the numbers of the object $O^T_{11}$ (table) and the objects $O^T_{21}$ to $O^T_{24}$ (chairs), and the positional relationship between them in the actual scene.

Figure 16:
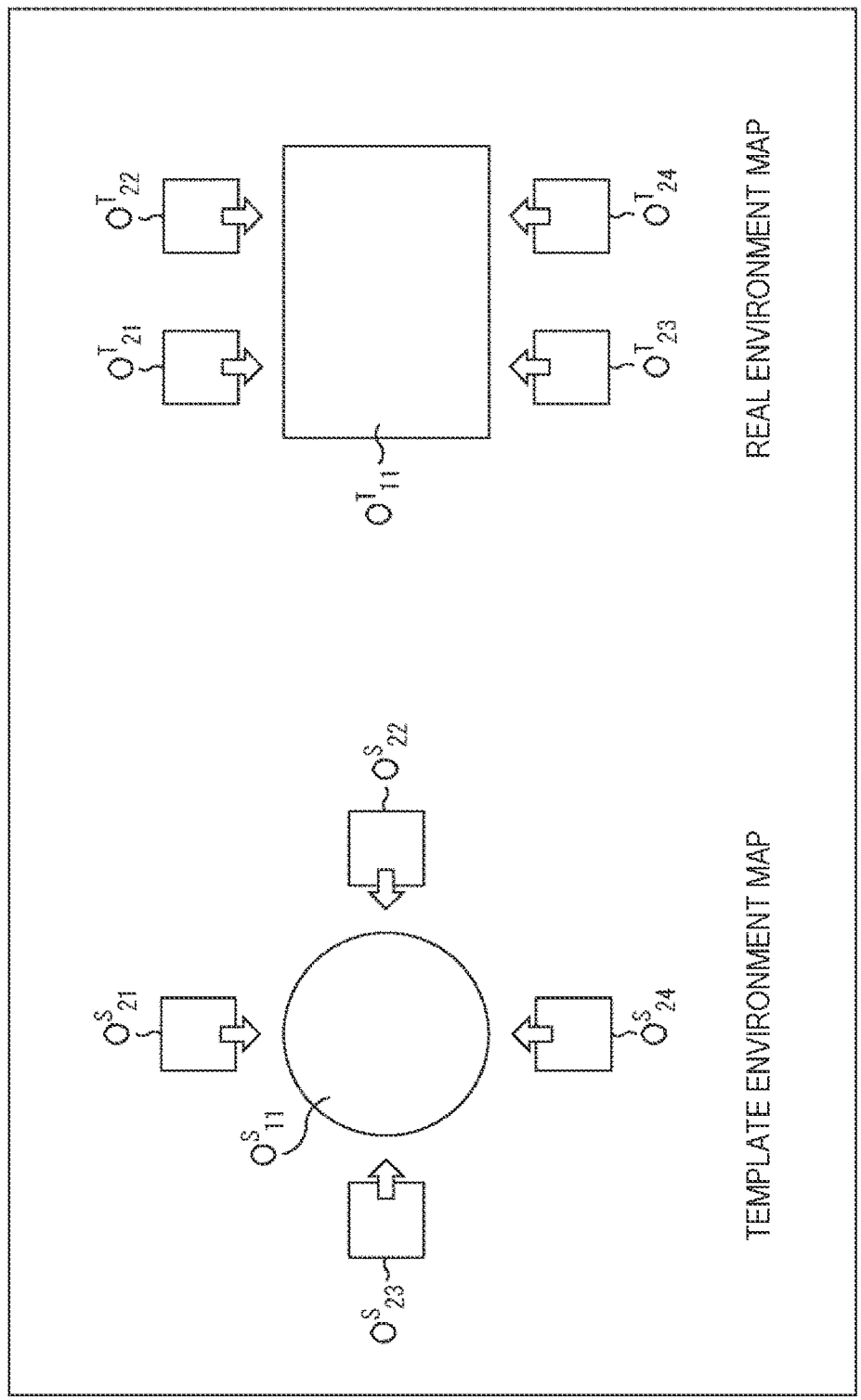
FIG. 16 is a diagram showing an example of the positional relationship between the respective objects.

FIG. 16 is a diagram showing an example of the positional relationship between the respective objects.

The positional relationship between the object $O^S_{11}$ and the objects $O^S_{21}$ to $O^S_{24}$ in the template scene indicated by the template environment map is as shown on the left side in FIG. 16.

On the other hand, the positional relationship between the object $O^T_{11}$ and the objects $O^T_{21}$ to $O^T_{24}$ in the actual scene indicated by the real environment map is as shown on the right side in FIG. 16.

The positional relationship between the object $O^S_{11}$ and the objects $O^S_{21}$ to $O^S_{24}$ in the template scene is the same as the positional relationship between the object $O^T_{11}$ and the objects $O^T_{21}$ to $O^T_{24}$ in the actual scene in that four chairs exist at positions surrounding the object having the same attribute "table".

Note that, in FIG. 16, arrows in the vicinities of the objects $O^S_{21}$ to $O^S_{24}$ and the objects $O^T_{21}$ to $O^T_{24}$ indicate the orientations of the chairs.

In this case, as shown in the lower portion of FIG. 15, AR content for display that realizes an appearance in which four different characters are seated on four chairs surrounding a table is generated on the basis of the template AR content. Here, the chairs that are used for seating the four characters are the objects $O^T_{21}$ to $O^T_{24}$ present in the actual scene.

Figure 17:
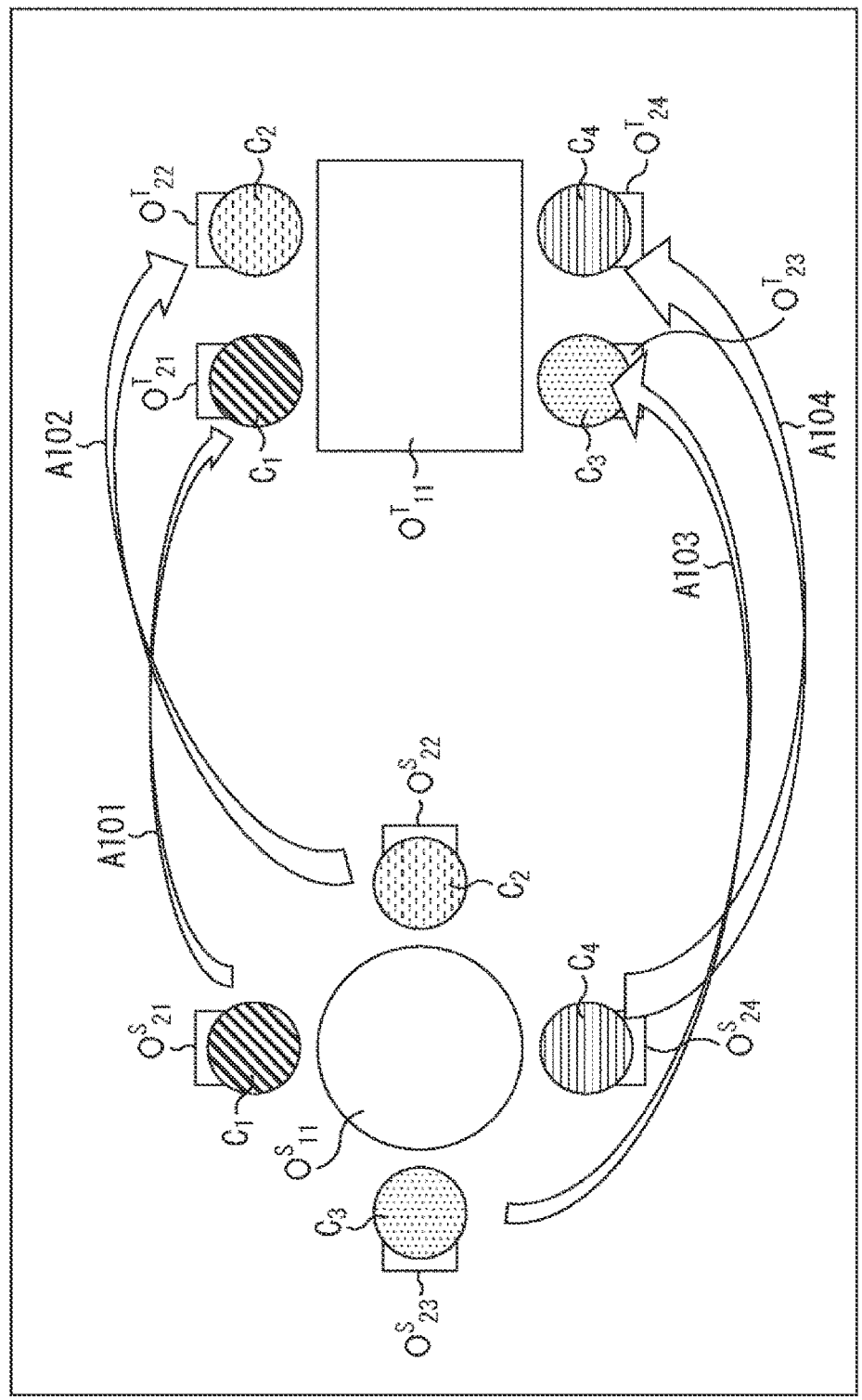
FIG. 17 is a diagram showing an example of replacement of the positions of the objects.

FIG. 17 is a diagram showing an example of replacement of the positions of the objects in the template AR content.

When the respective objects are in the positional relationship described above, the position of the character $C_1$ seated on the object $O^S_{21}$ in the template AR content is replaced with the position of the object $O^T_{21}$, as indicated by an arrow A101 in FIG. 17. In FIG. 17, the position of each character is represented by a circle with a predetermined pattern.

In the template AR content, the position of the character $C_1$ is set on the basis of the positions of the object $O^S_{11}$ and the object $O^S_{21}$, and the same positional relationship is maintained on the basis of the positions of the object $O^T_{11}$ and the object $O^T_{21}$.

Likewise, the position of the character $C_2$ seated on the object $O^S_{22}$ in the template AR content is replaced with the position of the object $O^T_{22}$ as indicated by an arrow A102. Also, the position of the character $C_3$ seated on the object $O^S_{23}$ in the template AR content is replaced with the position of the object $O^T_{23}$ as indicated by an arrow A103. The position of the character $C_4$ seated on the object $O^S_{24}$ in the template AR content is replaced with the position of the object $O^T_{24}$ as indicated by an arrow A104.

As the AR content for display generated by replacing the positions in this manner, the appearances of the characters $C_1$ to $C_4$ as described with reference to FIG. 4 are realized.

Referring back to FIG. 14, if it is determined in step S52 that the number of and the relative positional relationship between the detected objects $O^T\_i$ do not match the number of and the relative positional relationship between the objects $O^S\_i$, respectively, the process moves on to step S54.

In step S54, the display AR content generation unit 86 searches for an object $O^{T1}\_i$ having an attribute $X'\_i$ similar to an object $O^S\_i$ indicated by the template environment map, from among the objects $O^T\_i$ present in the actual scene indicated by the real environment map.

The attribute $X'\_i$ similar to the attribute $X\_i$ is defined beforehand in a table or the like at the time of generation of the template AR content, for example. The attribute $X'\_i$ may be designated by the user at the time of generation of the AR content for display.

In step S55, the display AR content generation unit 86 determines whether or not the number of the objects $O^T\_i$ and the relative positional relationship between the objects $O^T\_i$, including the detected objects $O^{T1}\_i$, match the number of the objects $O^S\_i$ having the attribute $X\_i$ and the relative positional relationship between the objects $O^S\_i$ indicated by the template environment map, respectively.

Here, when the same number of objects having the same attribute, including the objects having the similar attribute, are present in both the template scene and the actual scene, and the positional relationship between the respective objects in the template scene is the same as the positional relationship in the actual scene, it is determined that the conditions are satisfied.

If it is determined in step S55 that the number of and the relative positional relationship between the objects $O^T\_i$ match the number of and the relative positional relationship between the objects $O^S\_i$, respectively, the process moves on to step S53.

In step S53, AR content for display is generated by replacing the positions of the objects based on the positions of the objects $O^S\_i$ in the template AR content with the positions based on the positions of the objects $O^T\_i$, as in the process described above.

FIG. 18 is a diagram showing an example (Example 2-2) of the real environment map and the AR content for display.

The real environment map shown in the upper portion of FIG. 18 indicates a scene in which there exists a floor surface, and one table, four chairs, and one sofa exist on the floor surface. In this example, three of the four chairs surround the table, but one chair is located away from the table. Meanwhile, the one sofa is located in the vicinity of the table.

For example, when a template environment map indicating the template scene (FIG. 5) described with reference to FIG. 11 has been prepared, the object $O^T_{11}$ having the same attribute "table" as the object $O^S_{11}$ (FIG. 5) is detected as an object $O^T\_i$ having the same attribute $X\_i$ as the object $O^S\_i$.

Likewise, the object $O^T_{21}$ having the same attribute "chair" as the object $O^S_{21}$, the object $O^T_{22}$ having the same attribute "chair" as the object $O^S_{22}$, the object $O^T_{23}$ having the same attribute "chair" as the object $O^S_{23}$, and the object $O^T_{24}$ having the same attribute "chair" as the object $O^S_{24}$ are all detected.

Further, it is determined that the numbers of the object $O^S_{11}$ (table) and the objects $O^S_{21}$ to $O^S_{24}$ (chairs), and the positional relationship between them in the template scene are not the same as the numbers of the object $O^T_{11}$ (table) and the objects $O^T_{21}$ to $O^T_{24}$ (chairs), and the positional relationship between them in the actual scene.

Figure 19:
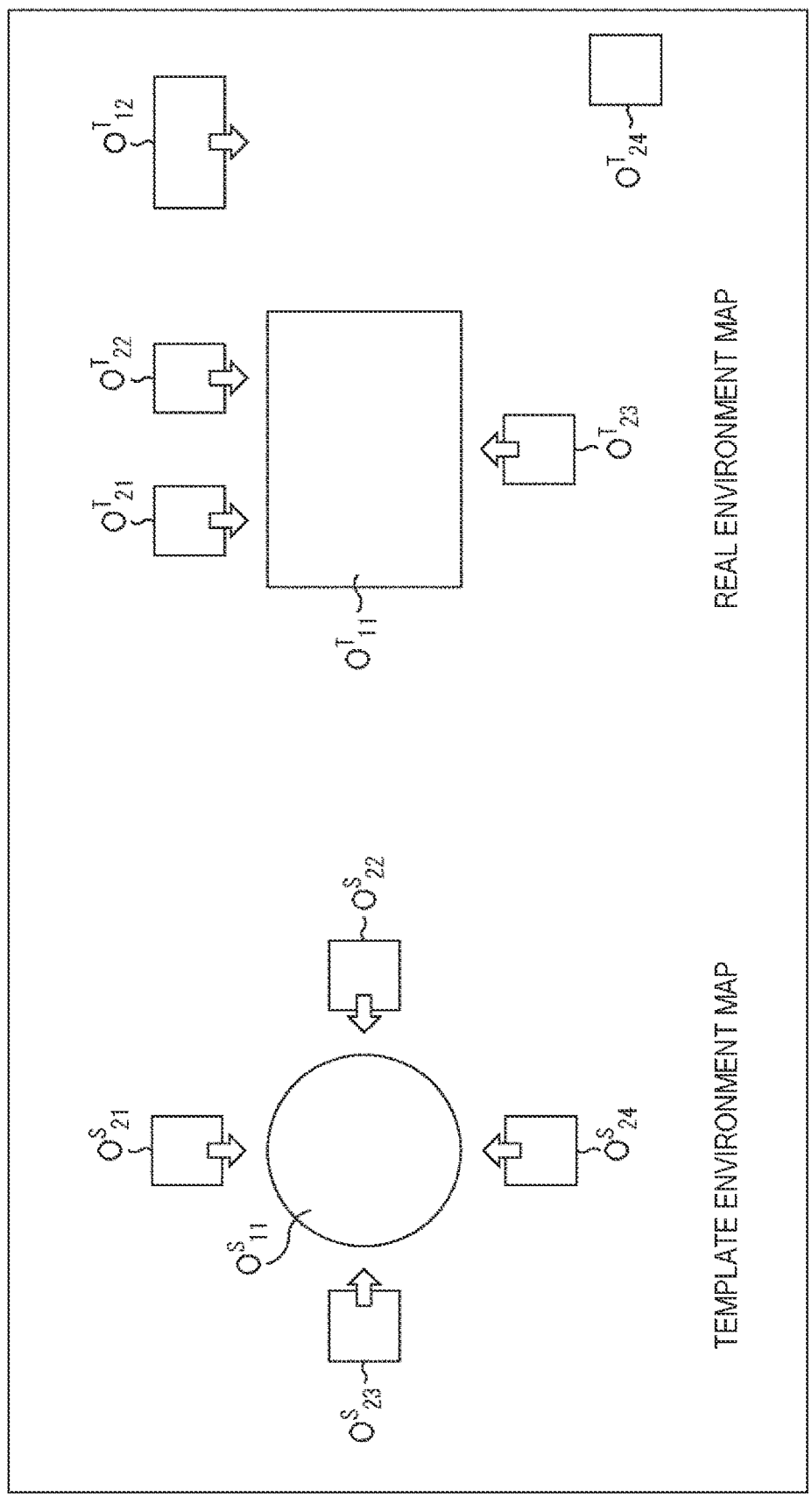
FIG. 19 is a diagram showing an example of the positional relationship between the respective objects.

FIG. 19 is a diagram showing an example of the positional relationship between the respective objects.

The positional relationship between the object $O^S_{11}$ and the objects $O^S_{21}$ to $O^S_{24}$ in the template scene shown on the left side in FIG. 19 is the same as the positional relationship described with reference to FIG. 16.

On the other hand, the positional relationship between the object $O^T_{11}$ and the objects $O^T_{21}$ to $O^T_{24}$ in the actual scene indicated by the real environment map is as shown on the right side in FIG. 19. In the actual scene, there also exists the object $O^T_{12}$, which is a sofa.

The positional relationship between the object $O^S_{11}$ and the objects $O^S_{21}$ to $O^S_{24}$ in the template scene is not the same as the positional relationship between the object $O^T_{11}$ and the objects $O^T_{21}$ to $O^T_{24}$ in the actual scene in that the object $O^T_{24}$, which is a "chair", exists at a distant position.

In this case, the object $O^T_{12}$ having the attribute "sofa" similar to the attribute "chair" is retrieved from among the objects $O^T\_i$ present in the actual scene indicated by the real environment map.

Further, it is determined that the numbers of the object $O^S_{11}$ (table) and the objects $O^S_{21}$ to $O^S_{24}$ (chairs), and the positional relationship between them in the template scene are the same as the numbers of the object $O^T_{11}$ (table), the objects $O^T_{21}$ to $O^T_{23}$ (chairs), and the object $O^T_{12}$ (sofa), and the positional relationship between them in the actual scene, including the object $O^T_{12}$.

In this case, as shown in the lower portion of FIG. 18, AR content for display that realizes an appearance in which four different characters are seated on three chairs surrounding a table and a sofa in the vicinity of the table is generated on the basis of the template AR content. Here, the chairs that are used for seating the four characters are the objects $O^T_{21}$ to $O^T_{23}$ and the object $O^T_{12}$ present in the actual scene.

Figure 20:
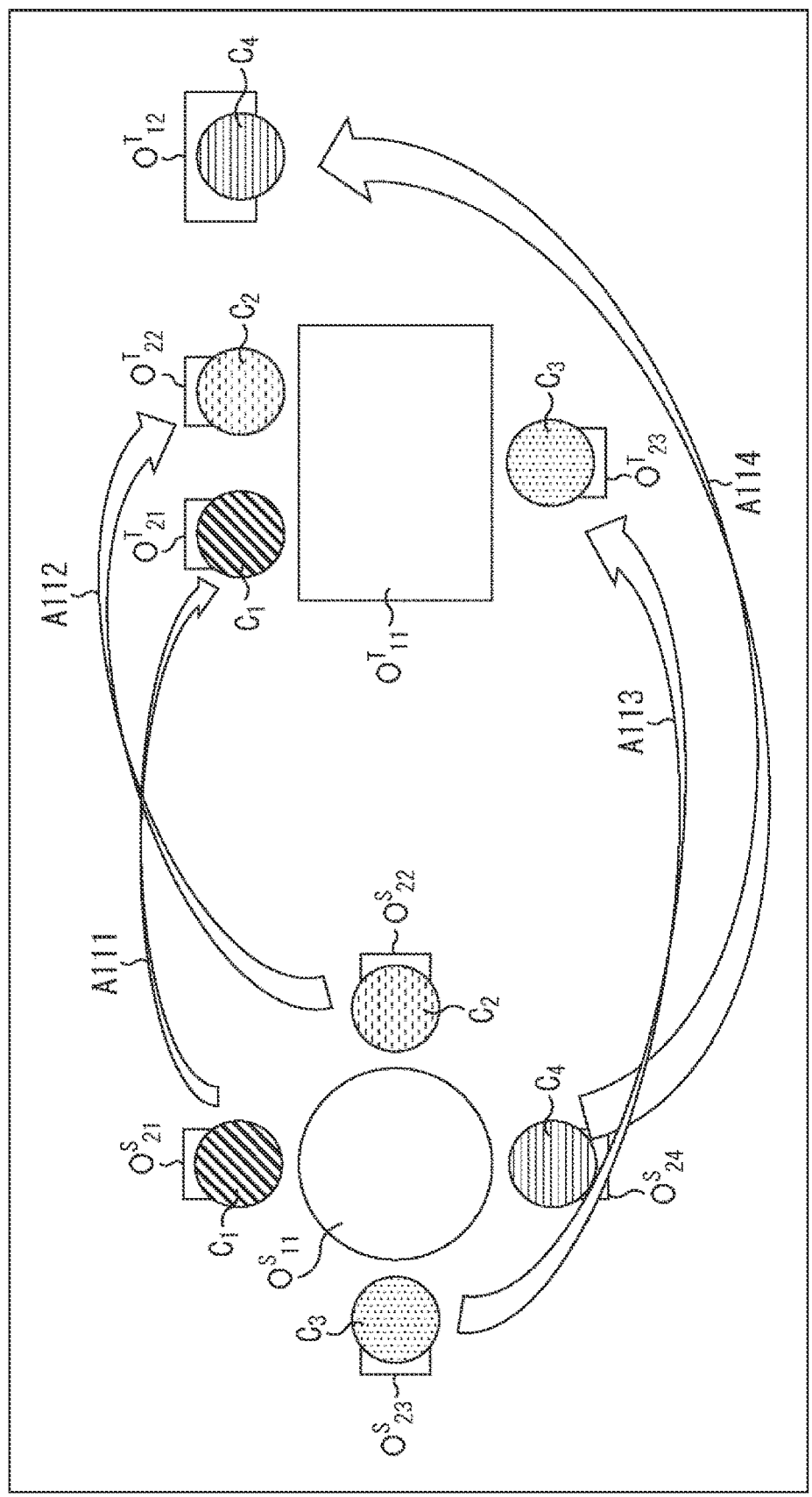
FIG. 20 is a diagram showing an example of replacement of the positions of the objects.

FIG. 20 is a diagram showing an example of replacement of the positions of the objects in the template AR content.

When the respective objects are in the positional relationship shown in FIG. 19, the position of the character $C_1$ seated on the object $O^S_{21}$ in the template AR content is replaced with the position of the object $O^T_{21}$, as indicated by an arrow A111 in FIG. 20.

Likewise, the position of the character $C_2$ seated on the object $O^S_{22}$ in the template AR content is replaced with the position of the object $O^T_{22}$ as indicated by an arrow A112. The position of the character $C_3$ seated on the object $O^S_{23}$ in the template AR content is replaced with the position of the object $O^T_{23}$ as indicated by an arrow A113.

Also, the position of the character $C_4$ seated on the object $O^S_{24}$ in the template AR content is replaced with the position of the object $O^T_{12}$, which is a sofa, as indicated by an arrow A114.

As described above, when there are no objects having the same attribute as any of the objects existing in the template scene, the position of a character is replaced with the position of an object having a similar attribute.

With this arrangement, even when there are no objects that are exactly the same as an object present in the template scene, the template AR content can be applied to the actual scene.

Referring back to FIG. 14, if it is determined in step S55 that the number of and the relative positional relationship between the detected objects $O^T\_i$ do not match the number of and the relative positional relationship between the objects $O^S\_i$, respectively, the process moves on to step S56.

In this case, even if objects having a similar attribute are included, the same number of objects and the same positional relationship as the objects present in the template scene are not present in the actual scene.

In step S56, the display AR content generation unit 86 generates objects C_j (virtual objects) having the same attribute $X\_i$ as the objects $O^S\_i$ indicated by the template environment map, the number of the objects C_j being equivalent to the shortage.

When there are not enough objects having the attribute "chair" in the actual scene, objects having the attribute "chair" are generated. Instead of objects having the same attribute, objects having a similar attribute may be generated.

In step S57, the display AR content generation unit 86 determines the positions of the objects C_j so that the relative positional relationship between the objects $O^T\_i$ present in the actual scene and the newly generated objects C_j matches the positional relationship between the objects $O^S\_i$ in the template scene. Here, the objects $O^T\_i$ also include the objects $O^{T_1}\_i$ detected in step S54.

In step S58, the display AR content generation unit 86 generates AR content for display by replacing the positions of the objects based on the positions of the objects $O^S\_i$ in the template AR content with the positions based on the positions of the objects $O^T\_i$ and the objects $C\_j$.

FIG. 21 is a diagram showing an example (Example 2-3) of the real environment map and the AR content for display.

The real environment map shown in the upper portion of FIG. 21 indicates a scene in which there exists a floor surface, and one table and three chairs on the floor surface. In this example, the three chairs surround the table.

For example, when a template environment map indicating the template scene (FIG. 5) described with reference to FIG. 11 has been prepared, the object $O^T_{11}$ having the same attribute "table" as the object $O^S_{11}$ (FIG. 5) is detected as an object $O^T\_i$ having the same attribute $X\_i$ as the object $O^S\_i$.

Likewise, the object $O^T_{21}$ having the same attribute "chair" as the object $O^S_{21}$, the object $O^T_{22}$ having the same attribute "chair" as the object $O^S_{22}$, and the object $O^T_{23}$ having the same attribute "chair" as the object $O^S_{23}$ are all detected.

Further, it is determined that the numbers of the object $O^S_{11}$ (table) and the objects $O^S_{21}$ to $O^S_{24}$ (chairs), and the positional relationship between them in the template scene are not the same as the numbers of the object $O^T_{11}$ (table) and the objects $O^T_{21}$ to $O^T_{23}$ (chairs), and the positional relationship between them in the actual scene. In the actual scene, the number of chairs is one short.

Figure 22:
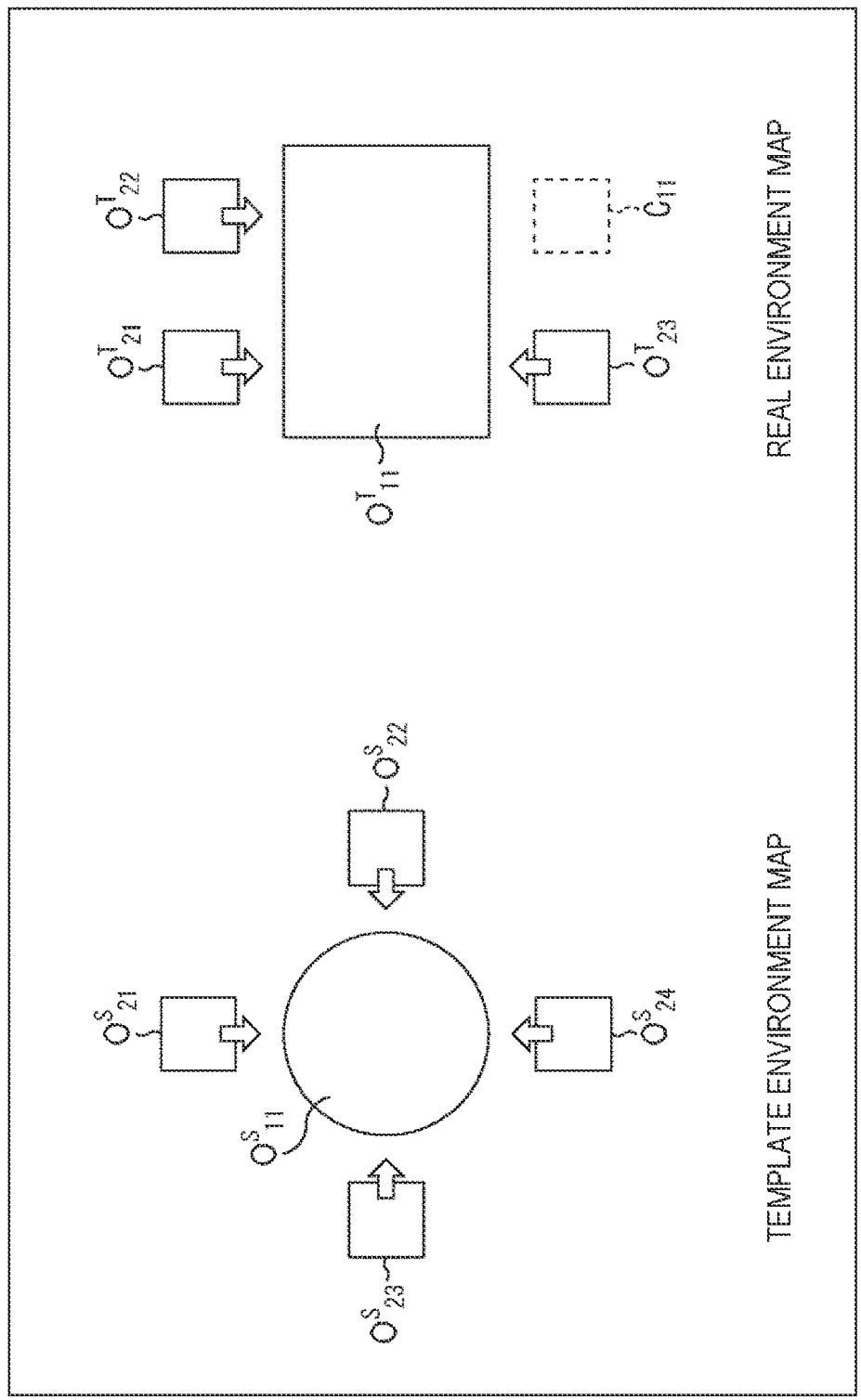
FIG. 22 is a diagram showing an example of the positional relationship between the respective objects.

FIG. 22 is a diagram showing an example of the positional relationship between the respective objects.

The positional relationship between the object $O^S_{11}$ and the objects $O^S_{21}$ to $O^S_{24}$ in the template scene shown on the left side in FIG. 22 is the same as the positional relationship described with reference to FIGS. 16 and 19.

On the other hand, the positional relationship between the object $O^T_{11}$ and the objects $O^T_{21}$ to $O^T_{23}$ in the actual scene indicated by the real environment map is as shown on the right side in FIG. 22.

The positional relationship between the object $O^S_{11}$ and the objects $O^S_{21}$ to $O^S_{24}$ in the template scene is not the same as the positional relationship between the object $O^T_{11}$ and the objects $O^T_{21}$ to $O^T_{23}$ in the actual scene in being one "chair" short.

In this case, an object $C_{11}$ having the attribute "chair" is generated.

Further, as indicated by a dashed line, the position of the object $C_{11}$ is determined so as to achieve the same positional relationship as the positional relationship between the object $O^S_{11}$ and the objects $O^S_{21}$ to $O^S_{24}$ in the template scene. The positional relationship among the object $O^T_{11}$, the objects $O^T_{21}$ to $O^T_{23}$, and the object $C_{11}$ in the actual scene shown on the right side in FIG. 21 is the same as the positional relationship between the object $O^S_{11}$ and the objects $O^S_{21}$ to $O^S_{24}$ in the template scene.

In this case, as shown in the lower portion of FIG. 21, AR content for display that realizes an appearance in which four different characters are seated on three chairs surrounding a table and a virtual chair is generated on the basis of the template AR content. Here, the chairs that are used for seating the four characters are the objects $O^T_{21}$ to $O^T_{23}$ present in the actual scene, and the virtual object $C_{11}$. The AR content for display also includes video data for displaying the object $C_{11}$.

Figure 23:
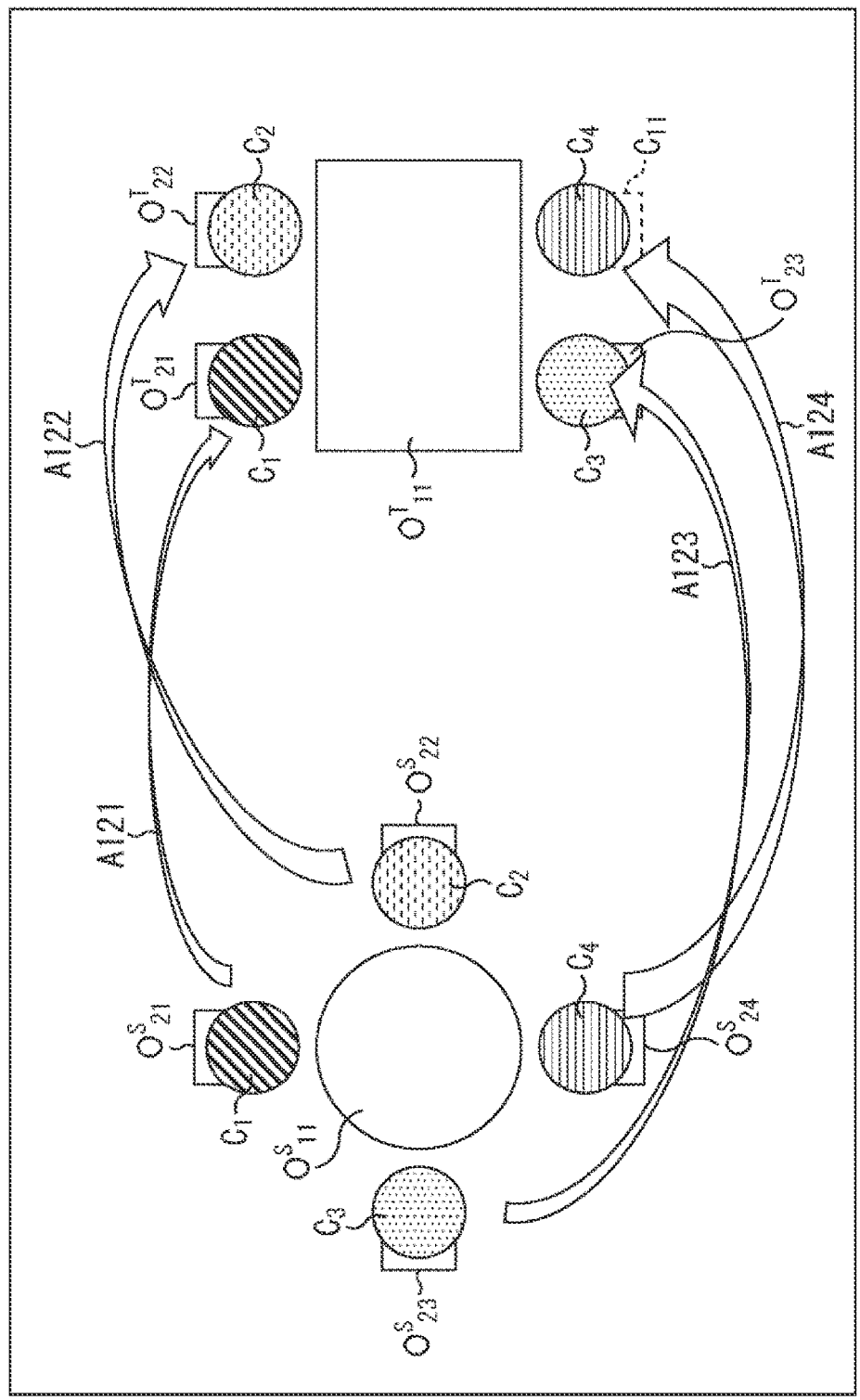
FIG. 23 is a diagram showing an example of replacement of the positions of the objects.

FIG. 23 is a diagram showing an example of replacement of the positions of the objects in the template AR content.

When the respective objects are in the positional relationship shown in FIG. 22, the position of the character $C_1$ seated on the object $O^S_{21}$ in the template AR content is replaced with the position of the object $O^T_{21}$, as indicated by an arrow A121 in FIG. 23.

Likewise, the position of the character $C_2$ seated on the object $O^S_{22}$ in the template AR content is replaced with the position of the object $O^T_{22}$ as indicated by an arrow A122. The position of the character $C_3$ seated on the object $O^S_{23}$ in the template AR content is replaced with the position of the object $O^T_{23}$ as indicated by an arrow A123.

Also, the position of the character $C_4$ seated on the object $O^S_{24}$ in the template AR content is replaced with the position of the object $C_{11}$ as indicated by an arrow A124.

As described above, when the number of objects present in the actual scene is not enough, the position of a character is replaced with that of a virtual object.

With this arrangement, even when there are no objects that are exactly the same as an object present in the template scene, the template AR content can be applied to the actual scene.

After the AR content for display is generated in step S53 or step S58, the process comes to an end.

In the above processes, the AR content provider does not need to generate AR content individually for each specific scene. Furthermore, the AR content provider does not need to acquire beforehand the environment map of the actual scene in which the AR content is to be viewed.

Meanwhile, the user can view and experience one general-purpose template AR content in various scenes.

For example, there is a technology related to AR that detects a primitive shape such as a plane on the basis of an environment map of an actual scene, and displays an object in accordance with the position and the posture of the detected shape.

As described above, as the positions of objects are determined by comparing the numbers of and the positional relationship among the plurality of objects in the template scene with the numbers of and the positional relationship among the plurality of objects in the actual scene, it is possible to arrange the objects in a scene having a complicated three-dimensional shape and allow the user to view the objects. In other words, the AR content provider can provide AR content that is rich in expressions.

<<Modification>>
<Example System Configuration>

At least part of the configuration of the information processing unit 71 shown in FIG. 10 may be formed in the HMD 1. For example, the configuration on the generation side of the template (the template environment map and the template AR content) can be realized in the information processing unit 71, and the configuration on the reproduction side of the AR content can be realized in the HMD 1.

Figure 24:
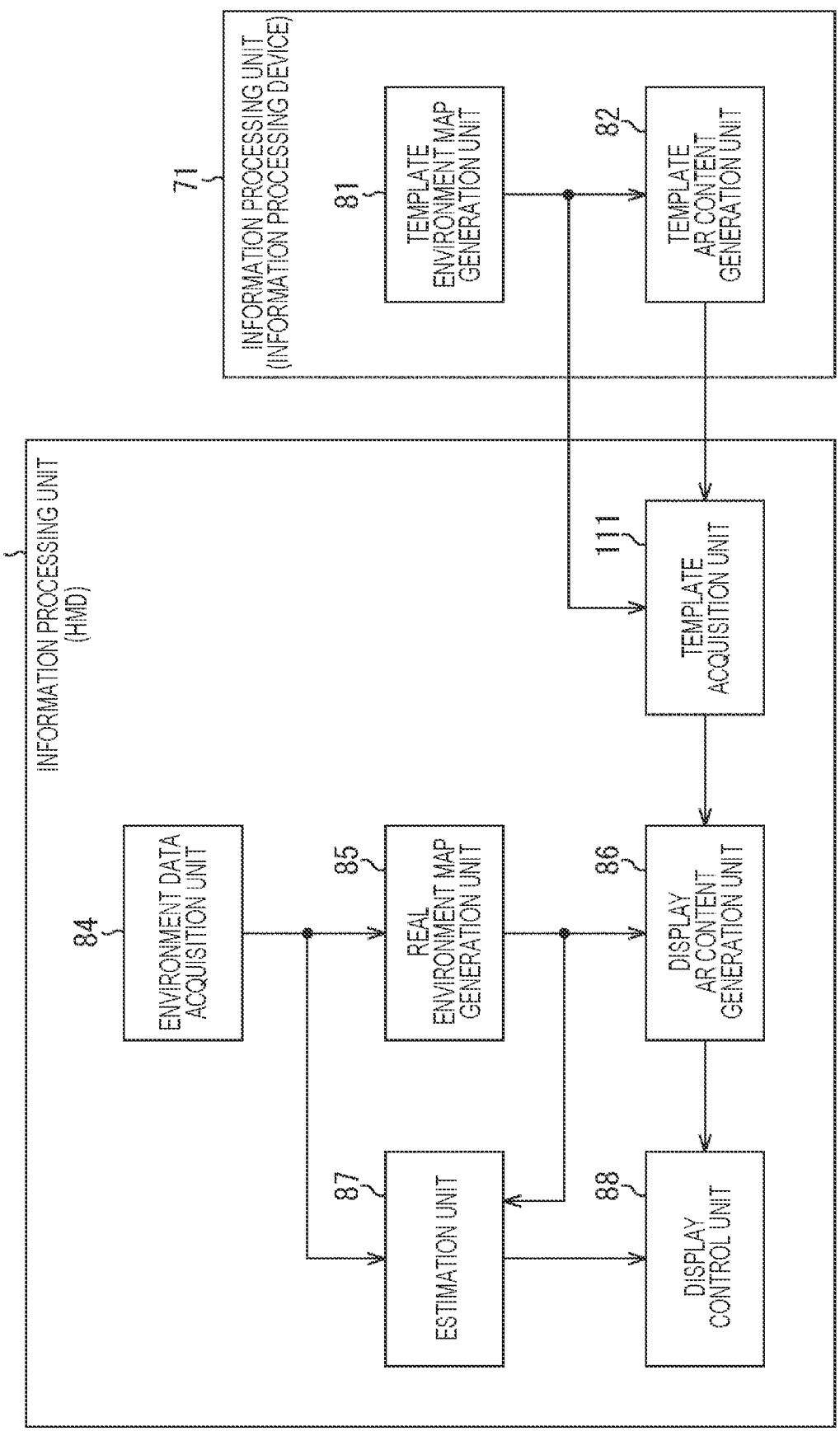
FIG. 24 is a block diagram showing another example configuration of an information processing system.

FIG. 24 is a block diagram showing another example configuration of an information processing system.

In the configuration shown in FIG. 24, the same components as those described with reference to FIG. 10 are denoted by the same reference numerals as those used in FIG. 10. The explanations that have already been made will not be repeated.

In the HMD 1, the control unit 11 shown in FIG. 8 executes a predetermined program, to form an information processing unit 101.

The information processing unit 101 includes an environment data acquisition unit 84, a real environment map generation unit 85, a display AR content generation unit 86, an estimation unit 87, a display control unit 88, and a template acquisition unit 111.

The template acquisition unit 111 controls the communication unit 14, to acquire a template that has been generated at the information processing unit 71 of the information processing device 2 and been transmitted from the information processing device 2. The template acquisition unit 111 outputs the acquired template to the display AR content generation unit 86 at the time of reproduction of AR content.

As described above, the process including the generation of the real environment map and the generation of the AR content for display can be performed in the HMD 1.

<Example Configuration of a Computer>

The series of processes described above can be performed by hardware, and can also be performed by software. When the series of processes are performed by software, the program that forms the software may be installed in a computer incorporated into special-purpose hardware, or may be installed into a general-purpose personal computer or the like.

The program to be installed is recorded in a removable medium 61 shown in FIG. 9 formed with an optical disk (a compact disc-read only memory (CD-ROM), a digital versatile disc (DVD), or the like), a semiconductor memory, or the like, and is then provided. Alternatively, the program may be provided via a wired or wireless transmission medium, such as a local area network, the Internet, or digital broadcasting. The program can be installed beforehand into a ROM 52 or a storage unit 58.

Note that the program to be executed by the computer may be a program for performing processes in chronological order in accordance with the sequence described in this specification, or may be a program for performing processes in parallel or performing a process when necessary, such as when there is a call.

In this specification, a system means an assembly of a plurality of components (devices, modules (parts), and the like), and not all the components need to be provided in the same housing. In view of this, a plurality of devices that are housed in different housings and are connected to one another via a network forms a system, and one device having a plurality of modules housed in one housing is also a system.

Note that the advantageous effects described in this specification are merely examples, and the advantageous effects of the present technology are not limited to them or may include other effects.

Embodiments of the present technology are not limited to the embodiments described above, and various modifications may be made to them without departing from the scope of the present technology.

For example, the present technology may be embodied in a cloud computing configuration in which one function is shared among a plurality of devices via a network, and processing is performed by the devices cooperating with one another.

Further, the respective steps described with reference to the flowcharts described above may be carried out by one device or may be shared among a plurality of devices.

Furthermore, when a plurality of processes is included in one step, the plurality of processes included in the one step may be performed by one device or may be shared among a plurality of devices.

<Example Combinations of Configurations>

The present technology may also be embodied in the configurations described below.

(1)

An information processing device including:

a first map generation unit that generates a template environment map showing an environment of a three-dimensional space to be a template, a predetermined object existing in the three-dimensional space; and a first content generation unit that generates template content that is a template to be used in generating display content for displaying an object superimposed on an environment of a real space, the template content including information about the object disposed at a position in the three-dimensional space, the position having a predetermined positional relationship with the predetermined object.

(2)

The information processing device according to (1), further including:

a second map generation unit that generates a real environment map showing the environment of the real space; and a second content generation unit that generates the display content by processing the template content on the basis of the template environment map and the real environment map.

(3)

The information processing device according to (1) or (2), in which the first map generation unit generates the template environment map including information indicating an attribute of the predetermined object, and information indicating a positional relationship of the predetermined object.

(4)

The information processing device according to (2), in which the second map generation unit generates the real environment map including information indicating an attribute of a real object that is an object existing in the real space, and information indicating a positional relationship of the real object.

(5)

The information processing device according to (4), in which the second content generation unit sets a position of the object included in the template content, on the basis of the positional relationship of the real object indicated by the information included in the real environment map.

(6)

The information processing device according to (5), in which the second content generation unit sets the position of the object, on the basis of the positional relationship of the real object having the same attribute as the predetermined object.

(7)

The information processing device according to (6), in which, when the real object having the same attribute as the predetermined object has the same positional relationship as the positional relationship of the predetermined object in the three-dimensional space, the second content generation unit sets the position of the object, to establish the same positional relationship as the positional relationship based on the predetermined object, with the real object.

(8)
The information processing device according to (5), in which
the second content generation unit sets the position of the object, on the basis of the positional relationship of the real object having an attribute similar to the predetermined object.

(9)
The information processing device according to (5), in which
the second content generation unit generates the display content including data of a virtual object having the same attribute as the predetermined object.

(10)
The information processing device according to (9), in which
the second content generation unit generates the display content including data of the virtual object disposed at a position having the same positional relationship as the positional relationship of the predetermined object.

(11)
The information processing device according to any one of (4) to (10), in which
the second map generation unit generates the real environment map, on the basis of at least either an image obtained by capturing the real space with a camera or distance information obtained by measuring a distance to the real object with a distance sensor.

(12)
The information processing device according to any one of (2) to (11), further including
a display control unit that reproduces the display content, to display the object superimposed on the real space.

(13)
An information processing method implemented in an information processing device, the information processing method including:
generating a template environment map showing an environment of a three-dimensional space to be a template, a predetermined object existing in the three-dimensional space; and
generating template content that is a template to be used in generating display content for displaying an object superimposed on an environment of a real space, the template content including information about the object disposed at a position in the three-dimensional space, the position having a predetermined positional relationship with the predetermined object.

(14)
A program for causing a computer to perform a process including:
generating a template environment map showing an environment of a three-dimensional space to be a template, a predetermined object existing in the three-dimensional space; and
generating template content that is a template to be used in generating display content for displaying an object superimposed on an environment of a real space, the template content including information about the object disposed at a position in the three-dimensional space, the position having a predetermined positional relationship with the predetermined object.

(15)
An information processing device including:
a template acquisition unit that acquires a template environment map showing an environment of a three-dimensional space that is to be a template and in which a predetermined object exists, and template content that is a template to be used in generating display content for displaying an object superimposed on an environment of a real space and includes information about the object disposed at a position in the three-dimensional space, the position having a predetermined positional relationship with the predetermined object;
a map generation unit that generates a real environment map showing the environment of the real space; and
a content generation unit that generates the display content by processing the template content on the basis of the template environment map and the real environment map.

(16)
An information processing method implemented in an information processing device, the information processing method including:
acquiring a template environment map showing an environment of a three-dimensional space that is to be a template and in which a predetermined object exists, and template content that is a template to be used in generating display content for displaying an object superimposed on an environment of a real space and includes information about the object disposed at a position in the three-dimensional space, the position having a predetermined positional relationship with the predetermined object;
generating a real environment map showing the environment of the real space; and
generating the display content by processing the template content on the basis of the template environment map and the real environment map.

(17)
A program for causing a computer to perform a process including:
acquiring a template environment map showing an environment of a three-dimensional space that is to be a template and in which a predetermined object exists, and template content that is a template to be used in generating display content for displaying an object superimposed on an environment of a real space and includes information about the object disposed at a position in the three-dimensional space, the position having a predetermined positional relationship with the predetermined object;
generating a real environment map showing the environment of the real space; and
generating the display content by processing the template content on the basis of the template environment map and the real environment map.

REFERENCE SIGNS LIST

1 HMD
2 Information processing device
71 Information processing unit
81 Template environment map generation unit
82 Template AR content generation unit
83 Template storage unit
84 Environment data acquisition unit
85 Real environment map generation unit
86 Display AR content generation unit
87 Estimation unit
88 Display control unit

The invention claimed is:
1. An information processing device comprising:
circuitry configured to:
generate a template environment map where a first positional relationship between a plurality of template static objects in a three-dimensional space and attribute information of the plurality of template static objects are associated with each other;

generate template content representing a second positional relationship between a plurality of virtual humans and the plurality of template static objects;

generate, on a basis of at least one of a captured image of a real space obtained from a camera or distance information of the real space obtained from a distance sensor, an actual environment map where an actual positional relationship between a plurality of real objects in the real space and attribute information of the plurality of real objects are associated with each other;

compare the template environment map with the actual environment map on a basis of the first positional relationship, the attribute information of the plurality of template static objects, the actual positional relationship, and the attribute information of the plurality of real objects; and determine, on a basis of the template content and the comparison of the template environment map with the actual environment map, a modified positional relationship between the plurality of virtual humans and the plurality of real objects in the real space.

2. The information processing device according to claim 1, wherein the circuitry is further configured to:

compare the template environment with the actual environment map on a basis of a number of the plurality of real objects and a number of the plurality of template static objects.

3. An information processing method implemented in an information processing device, the information processing method comprising:

generating a template environment map where a first positional relationship between a plurality of template static objects in a three-dimensional space and attribute information of the plurality of template static objects are associated with each other;

generating template content representing a second positional relationship between a plurality of virtual humans and the plurality of template static objects;

generating, on a basis of at least one of a captured image of a real space obtained from a camera or distance information of the real space obtained from a distance sensor, an actual environment map where an actual positional relationship between a plurality of real objects in the real space and attribute information of the plurality of real objects are associated with each other;

comparing the template environment map with the actual environment map on a basis of the first positional relationship, the attribute information of the plurality of template static objects, the actual positional relationship, and the attribute information of the plurality of real objects; and determining, on a basis of the template content and the comparison of the template environment map with the actual environment map, a modified positional relationship between the plurality of virtual humans and the plurality of real objects in the real space.

4. An information processing device comprising:
circuitry configured to:

acquire information representing a template environment map where a first positional relationship between a plurality of template static objects in a three-dimensional space and attribute information of the plurality of template static objects are associated with each other, and template content representing a second positional relationship between a plurality of virtual humans and the plurality of template static objects;

generate, on a basis of at least one of a captured image of a real space obtained from a camera or distance information of the real space obtained from a distance sensor, an actual environment map where an actual positional relationship between a plurality of real objects in the real space and attribute information of the plurality of real objects are associated with each other;

compare the template environment map with the actual environment map on a basis of the first positional relationship, the attribute information of the plurality of template static objects, the actual positional relationship, and the attribute information of the plurality of real objects; and determine, on a basis of the template content and the comparison of the template environment map with the actual environment map, a modified positional relationship between the plurality of virtual humans and the plurality of real objects in the real space.

5. An information processing method implemented in an information processing device, the information processing method comprising:

acquiring information representing a template environment map where a first positional relationship between a plurality of template static objects in a three-dimensional space and attribute information of the plurality of template static objects are associated with each other, and template content representing a second positional relationship between a plurality of virtual humans and the plurality of template static objects;

generating, on a basis of at least one of a captured image of a real space obtained from a camera or distance information of the real space obtained from a distance sensor, an actual environment map where an actual positional relationship between a plurality of real objects in the real space and attribute information of the plurality of real objects are associated with each other;

comparing the template environment map with the actual environment map on a basis of the first positional relationship, the attribute information of the plurality of template static objects, the actual positional relationship, and the attribute information of the plurality of real objects; and determining, on a basis of the template content and the comparison of the template environment map with the actual environment map, a modified positional relationship between the plurality of virtual humans and the plurality of real objects in the real space.

* * * * *